(12) United States Patent
Hecht et al.

(10) Patent No.: US 11,671,868 B2
(45) Date of Patent: *Jun. 6, 2023

(54) METHODS AND APPARATUS FOR OPTIMIZING TUNNELED TRAFFIC

(71) Applicants: Gilat Satellite Networks Ltd., Petah Tikva (IL); Softbank Corporation, Tokyo (JP)

(72) Inventors: Yoseph Hecht, Rehovot (IL); Hagay Katz, Moshav Herut (IL); Akihiko Tajika, Saitama (JP)

(73) Assignees: Gilat Satellite Networks Ltd., Petah Tikva (IL); Softbank Corporation, Tokyo (JP)

( * ) Notice: Subject to any disclaimer, the term of this patent is extended or adjusted under 35 U.S.C. 154(b) by 154 days.

This patent is subject to a terminal disclaimer.

(21) Appl. No.: 17/003,307

(22) Filed: Aug. 26, 2020

(65) Prior Publication Data

US 2020/0396641 A1 Dec. 17, 2020

Related U.S. Application Data

(63) Continuation of application No. 15/941,834, filed on Mar. 30, 2018, now Pat. No. 10,785,680, which is a (Continued)

(51) Int. Cl.
*H04W 28/06* (2009.01)
*H04L 69/22* (2022.01)
(Continued)

(52) U.S. Cl.
CPC ............ *H04W 28/06* (2013.01); *H04B 7/185* (2013.01); *H04L 67/02* (2013.01); *H04L 67/56* (2022.05);
(Continued)

(58) Field of Classification Search
CPC ......... H04L 47/10; H04L 47/12; H04L 47/20; H04L 47/24; H04L 47/32; H04L 47/38;
(Continued)

(56) References Cited

U.S. PATENT DOCUMENTS 8,331,363 B2 12/2012 Sato
8,542,078 B2 9/2013 de Jongh et al.
(Continued)

FOREIGN PATENT DOCUMENTS

CN 101232429 A 7/2008
CN 101843054 A 9/2010
(Continued)

OTHER PUBLICATIONS

International Search Report—PCT/IL2015/050611—dated Oct. 2, 2015.
(Continued)

*Primary Examiner* — Dady Chery
(74) *Attorney, Agent, or Firm* — Banner & Witcoff, Ltd.

(57) ABSTRACT

A satellite communication system may be configured to establish multiple different tunnels between a first satellite modem and a second satellite modem in accordance with a protocol. The first satellite modem may receive a packet via a tunnel established in accordance with a different protocol, determine an endpoint identifier corresponding to the tunnel based on information from one or more headers included in the packet, identify one of the multiple different tunnels that corresponds to the tunnel, generate a corresponding packet omitting at least a portion of the information from the one or more headers and comprising at least a portion of data included in a payload of the packet and an information block comprising a tunnel index corresponding to the identified one of the multiple different tunnels, and transmit the
(Continued)

corresponding packet to the second satellite modem via the identified one of the multiple different tunnels.

20 Claims, 6 Drawing Sheets

Related U.S. Application Data continuation of application No. 15/384,530, filed on Dec. 20, 2016, now Pat. No. 9,961,587, which is a continuation-in-part of application No. 14/740,297, filed on Jun. 16, 2015, now Pat. No. 10,021,594.

(60) Provisional application No. 62/028,287, filed on Jul. 23, 2014, provisional application No. 62/017,366, filed on Jun. 26, 2014.

(51) Int. Cl.
| | | |
|---|---|---|
| *H04L 69/08* | (2022.01) | |
| *H04L 69/18* | (2022.01) | |
| *H04L 69/04* | (2022.01) | |
| *H04L 67/02* | (2022.01) | |
| *H04W 76/12* | (2018.01) | |
| *H04B 7/185* | (2006.01) | |
| *H04L 67/56* | (2022.01) | |
| *H04W 84/06* | (2009.01) | |

(52) U.S. Cl.
CPC .............. *H04L 69/04* (2013.01); *H04L 69/08* (2013.01); *H04L 69/18* (2013.01); *H04L 69/22* (2013.01); *H04W 76/12* (2018.02); *H04W 84/06* (2013.01)

(58) Field of Classification Search
CPC ......... H04L 47/70; H04L 47/72; H04L 47/74; H04L 47/78; H04L 47/80; H04L 7/00; H04L 12/60; H04L 13/12; H04L 2001/0097; H04L 25/20; H04L 25/24; H04L 25/44; H04L 29/12566; H04L 61/2589; H04L 12/5689; H04L 45/00; H04L 45/10; H04L 45/22; H04L 49/25; H04L 49/256; H04L 12/64; H04L 12/6418; H04L 12/66; H04L 12/5601; H04L 49/101; H04L 29/06027; H04L 29/06326; H04L 29/0653; H04L 45/74; H04L 49/3009; H04L 49/309; H04L 29/06095; H04B 7/00; H04B 10/29; H04B 10/2937; H04B 2210/256; H04B 3/36; H04B 3/58; H04B 7/14; H04B 7/145; H04B 7/15; H04B 7/155; H04B 7/15507; H04B 7/185; H04B 7/18504; H04B 7/18508; H04B 7/1851; H04B 7/18513; H04B 7/18515; H04B 7/18521; H04B 7/18523; H04B 7/18528; H04B 7/1853; H04B 7/18552; H04B 7/18567; H04B 7/18576; H04B 7/18578; H04B 7/18595; H04J 1/10; H04J 14/0267; H04J 2203/0023; H04J 2203/0053; H04J 3/247; H04Q 2213/13191; H04Q 2213/191; H04Q 2213/218; H04Q 3/0008; H04Q 3/0012; H04Q 11/0478; H04W 84/047; H04W 88/04; H04W 84/06; H04W 40/00; H04W 40/02; H04W 40/26; H04H 40/90; H04M 2215/42; H04M 7/006

See application file for complete search history.

(56) References Cited

U.S. PATENT DOCUMENTS

| | | |
|---|---|---|
| 8,754,130 B2 | 6/2014 | Singleton et al. |
| 9,191,856 B2 | 11/2015 | Maehara et al. |
| 2006/0265504 A1 | 11/2006 | Taaghol et al. |
| 2009/0016334 A1 | 1/2009 | Forsberg et al. |
| 2010/0010386 A1 | 4/2010 | Ulupinar et al. |
| 2010/0265950 A1* | 10/2010 | Foxworthy ........... H04L 49/602 370/392 |
| 2010/0322151 A1 | 12/2010 | Racz et al. |
| 2014/0064246 A1* | 3/2014 | Baillargeon .......... H04W 76/12 370/329 |
| 2014/0153489 A1 | 6/2014 | Perras et al. |
| 2015/0382240 A1 | 12/2015 | Hecht et al. |
| 2016/0261557 A1 | 9/2016 | Herrero et al. |

FOREIGN PATENT DOCUMENTS

| | | |
|---|---|---|
| CN | 102694810 A | 9/2012 |
| CN | 103477589 A | 12/2013 |
| EP | 1802039 A1 | 6/2007 |
| JP | 2010-130610 A | 6/2010 |
| JP | 2011-521530 A | 7/2011 |
| JP | 2012-507209 A | 3/2012 |
| JP | 2012-531090 A | 12/2012 |
| JP | 2013-153316 A | 8/2013 |
| WO | 2009/057204 A1 | 5/2009 |
| WO | 2009/134178 A1 | 11/2009 |

OTHER PUBLICATIONS

Feb. 26, 2018—EP Search Report, EP App No. 17207007.0.
Sep. 13, 2019—European Office Action—EP 15735745.0.

* cited by examiner

METHODS AND APPARATUS FOR OPTIMIZING TUNNELED TRAFFIC

PRIORITY CLAIM

This application is a continuation of U.S. patent application Ser. No. 15/941,834 filed Mar. 30, 2018, and entitled "Methods and Apparatus for Optimizing tunneled Traffic", which is a continuation of U.S. patent application Ser. No. 15/384,530, filed Dec. 20, 2016, and entitled "Methods and Apparatus for Optimizing Tunneled Traffic", which is a continuation-in-part of U.S. patent application Ser. No. 14/740,297, filed Jun. 16, 2015, and entitled "Methods and Apparatus for Optimizing Tunneled Traffic", which claims priority to U.S. Provisional Patent Application Ser. Nos. 62/028,287, filed Jul. 23, 2014, and entitled "Methods and Apparatus for Optimizing Tunneled Traffic" and 62/017,366, filed Jun. 26, 2014, and entitled "Methods and Apparatus for Optimizing Tunneled Traffic," the disclosures of each of which are incorporated by reference herein in their entireties and made part hereof.

FIELD

Aspects of the disclosure pertain to the field of data communication in general and to data communication over high latency media in particular.

BACKGROUND

The General Packet Radio Service (GPRS) supports data communication in cellular networks. In Third Generation (3G) and Long Term Evolution (LTE) cellular networks, data communication is exchanged using the GPRS Tunneling Protocol (GTP). The user data tunneling part of the GTP protocol (GTP-U) is used over interfaces between access points (base-stations) and core network entities in many types of cellular networks, including over IuB interfaces in Universal Mobile Telecommunication Systems (UMTS), IuH interfaces in 3G networks, and S1 interfaces in LTE networks. In 3G networks, the GTP-U is applied to all data traffic but not to voice traffic, which is carried outside GTP-U tunnels. In LTE networks, GTP-U may be applied to voice traffic (i.e., voice traffic can be carried inside a GTP tunnel), depending on the Voice over LTE (VoLTE) model used.

The interfaces between access points and core network entities may span large distances, over various types of links. When a satellite link or other high latency link is used for backhauling interfaces between access points and core networks entities (like the IuB, IuH, and S1 interfaces), traffic between access points and core network entities is subjected to high latency. Unfortunately, subjecting traffic to high latency often leads to performance degradation. In order to mitigate or prevent performance degradation and poor user experience, transmission Control Protocol (TCP) acceleration methods, Hyper Text Transfer Protocol (HTTP) acceleration methods, and/or various caching methods may be applied.

Satellite bandwidth is a limited resource with significant usage costs. Thus, cellular traffic backhauled over a satellite link should be backhauled in an efficient manner to minimize operation costs. Voice over IP (VoIP) traffic is often characterized by small packets with relatively high overhead. Transmitting VoIP traffic "as is" over a satellite link is likely to result in significantly inefficient utilization of the satellite resource. Accordingly, it may be desirable to identify and treat voice traffic (e.g., to minimize delay, jitter, packet loss, and/or overhead) to prevent degradation in voice quality and/or achieve more efficient utilization of satellite resources.

While there are known technologies for TCP acceleration, HTTP acceleration, caching, and VoIP treatment, they may be less effective when the traffic is encapsulated with tunneling information. A significant challenge exists in applying acceleration and caching methods to traffic encapsulated with tunneling information.

Examples of known technologies for acceleration, caching, and VoIP treatment are described in U.S. Pat. No. 6,947,440, to Chatterjee et al. and U.S. Pat. No. 8,837,349 to Yabo et al.

SUMMARY

The following presents a simplified summary in order to provide a basic understanding of some aspects of the disclosure. This summary is not an extensive overview of the disclosure. It is intended neither to identify key or critical elements of the disclosure nor to delineate the scope of the disclosure. The following summary merely presents some aspects of the disclosure in a simplified form as a prelude to the description below.

In accordance with aspects of the disclosure, a satellite communication system may be configured to establish multiple different tunnels between a first satellite modem and a second satellite modem in accordance with a protocol. The first satellite modem may receive a packet via a tunnel established in accordance with a different protocol, determine an endpoint identifier corresponding to the tunnel based on information from one or more headers included in the packet, identify one of the multiple different tunnels that corresponds to the tunnel, generate a corresponding packet omitting at least a portion of the information from the one or more headers and comprising at least a portion of data included in a payload of the packet and an information block comprising a tunnel index corresponding to the identified one of the multiple different tunnels, and transmit the corresponding packet to the second satellite modem via the identified one of the multiple different tunnels.

In some embodiments, tunnels (e.g., tunnels generated in accordance with GTP-U) may be extended over a satellite link. In some embodiments, a satellite communication system may comprise a sender station and a receiver station. The sender station (e.g., a satellite modem associated therewith) may be configured to receive (e.g., over a LAN interface) a packet comprising data encapsulated with tunneling information (e.g., in accordance with GTP-U), perform one or more methods in accordance with a protocol and/or an application associated with the packet to produce a corresponding packet, and transmit the corresponding packet (e.g., over a satellite link) to the receiver station (e.g., a satellite modem associated therewith). The receiver station may be configured to receive (e.g., over the satellite link) the packet transmitted by the sender station, perform one or more methods in accordance with the packet to produce a corresponding packet, and transmit (e.g., over a LAN interface) the packet it produces towards its next destination. In some embodiments, the stations may be configured to establish a tunnel corresponding to the tunneling information encapsulating the data included in the packet received by the sender station. In such embodiments, the sender station may be configured to transmit and the receiver station may be configured to receive (e.g., the corresponding packet produced by the sender station) via the tunnel established between the stations. In some embodiments, the packet produced by the receiver station may correspond to the tunnel established between the stations and/or comprise data encapsulated with the tunneling information encapsulating the data included in the packet received by the sender station.

In some embodiments, data may be received via a tunnel (e.g., a GTP tunnel), classified, and processed in accordance with its classification. In some embodiments, the data may be classified into one or more of a TCP class, an HTTP over TCP class, a Domain Name System (DNS) class, a Voice over Internet Protocol (VoIP) class, or a jitter- and/or delay-sensitive-traffic class.

In some embodiments, header compression may be applied to at least a portion of the data received via the tunnel. For example, one or more of an Ethernet, IP, UDP, or GTP header associated with the tunnel may be compressed.

In some embodiments, TCP traffic received via the tunnel may be accelerated (e.g., for transmission over a satellite link). For example, at each side of a satellite link, a TCP connection may be associated with a forward tunnel and a return tunnel. In some embodiments, TCP traffic may be accelerated at a sender station by generating an acknowledgement (e.g., a spoofed acknowledgement) corresponding to a segment received via a forward tunnel associated with the TCP connection and sending the acknowledgement to an originator of the segment via a return tunnel associated with the TCP connection. Additionally or alternatively, TCP traffic may be accelerated at a receiver station by recording in association with a corresponding TCP connection one or more values associated with an acknowledgment received for the segment via a forward tunnel associated with the TCP connection (e.g., from its destination) and dropping the acknowledgement in lieu of forwarding it to the sender station (e.g., when it may be unnecessary to send the acknowledgement over the satellite link).

In some embodiments, HTTP traffic received via the tunnel may be accelerated (e.g., to improve user browsing experience). For example, HTTP traffic may be accelerated utilizing one or more pre-fetching or caching techniques. Moreover, since the data underlying HTTP traffic is often communicated via one or more TCP connections, the acceleration of TCP traffic may also accelerate HTTP traffic.

In some embodiments, redundant information included in the traffic received via the tunnel may be identified and eliminated.

In some embodiments, UDP traffic (e.g., SIP signaling traffic, RTP traffic, DNS traffic, non-RTP real-time traffic, other non-real-time traffic, or the like) received via the tunnel may be identified for specialized processing.

BRIEF DESCRIPTION OF THE DRAWINGS

Figure 1:
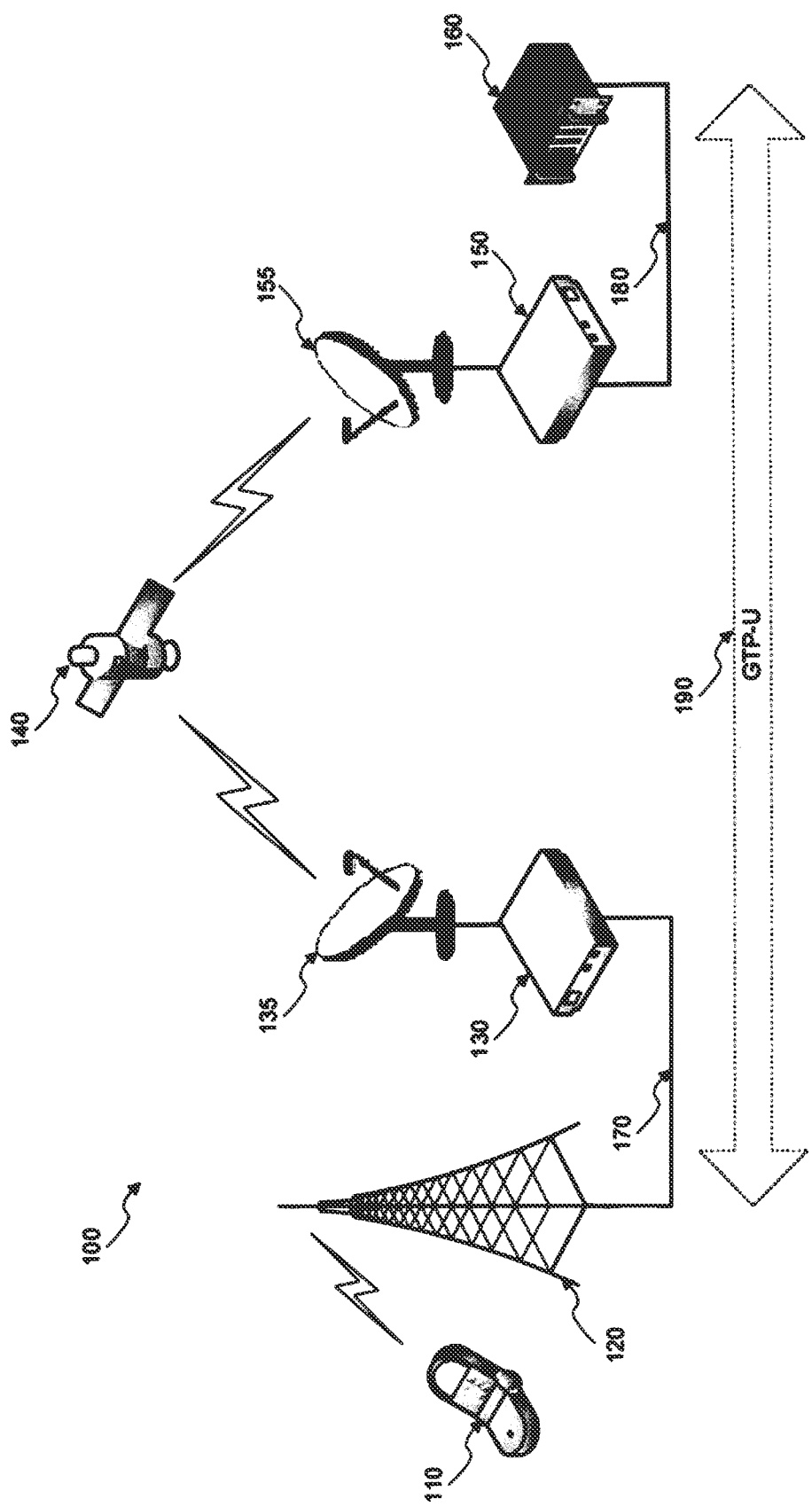
Figure 2:
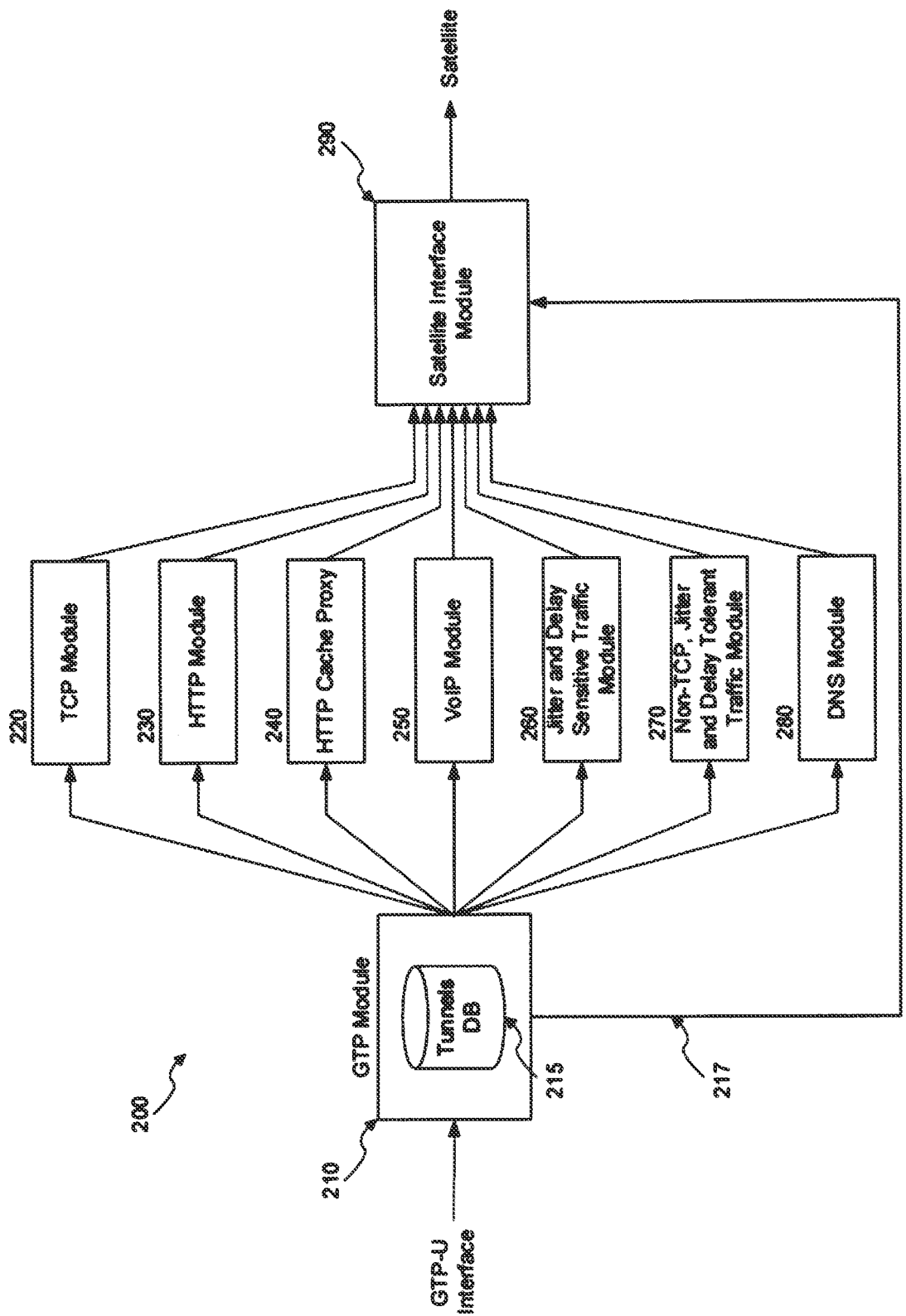
Figure 3:
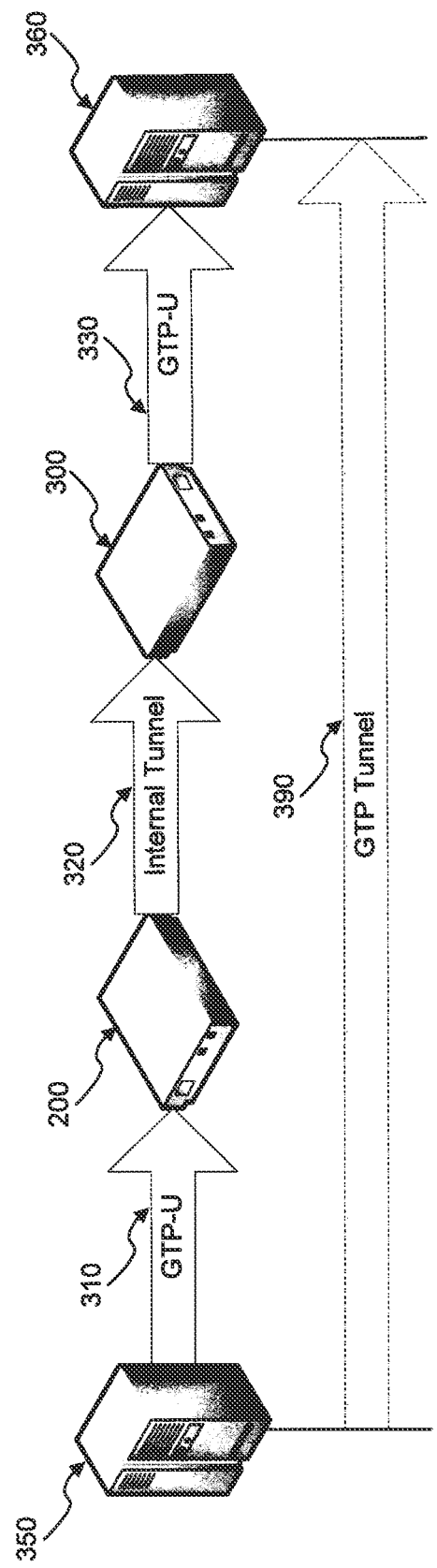
Figure 4:
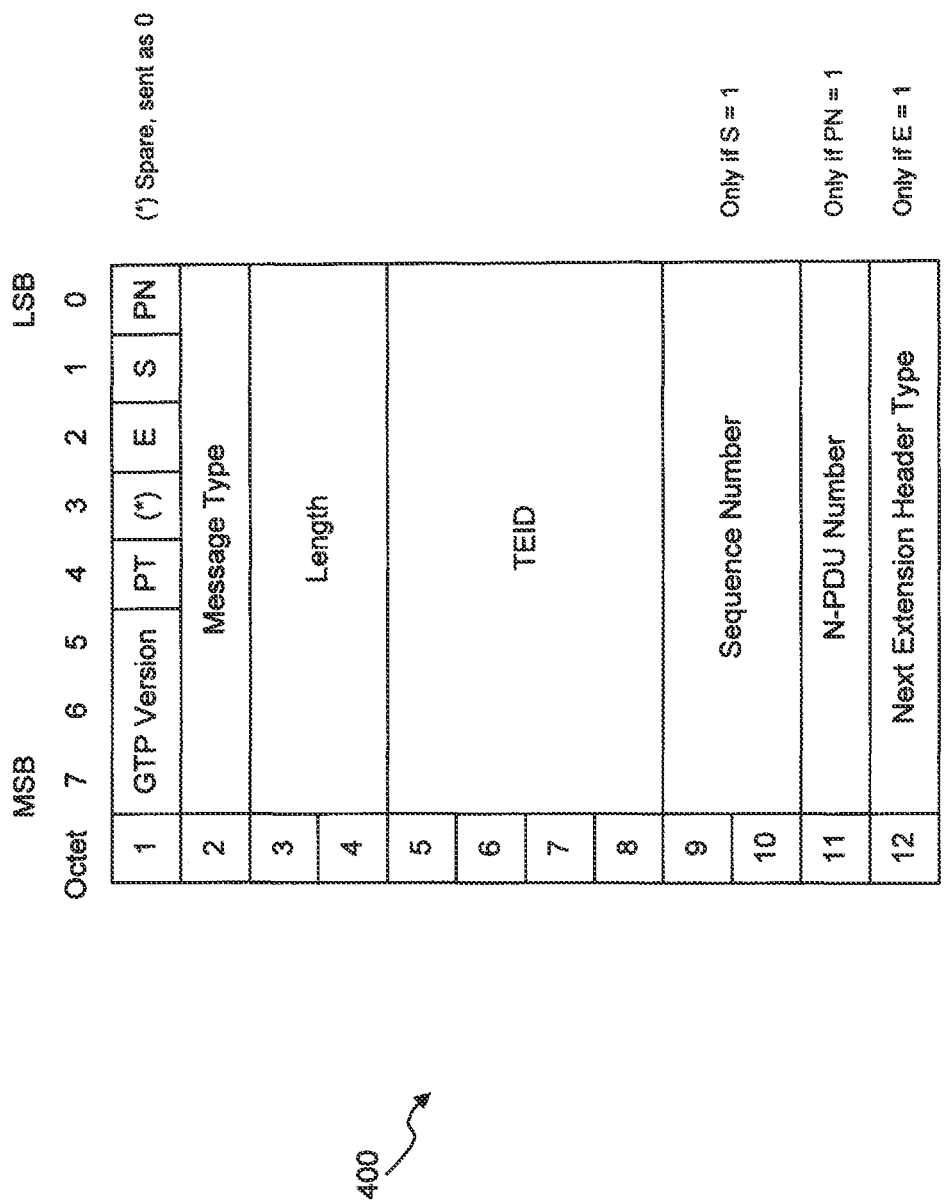
Figure 5:
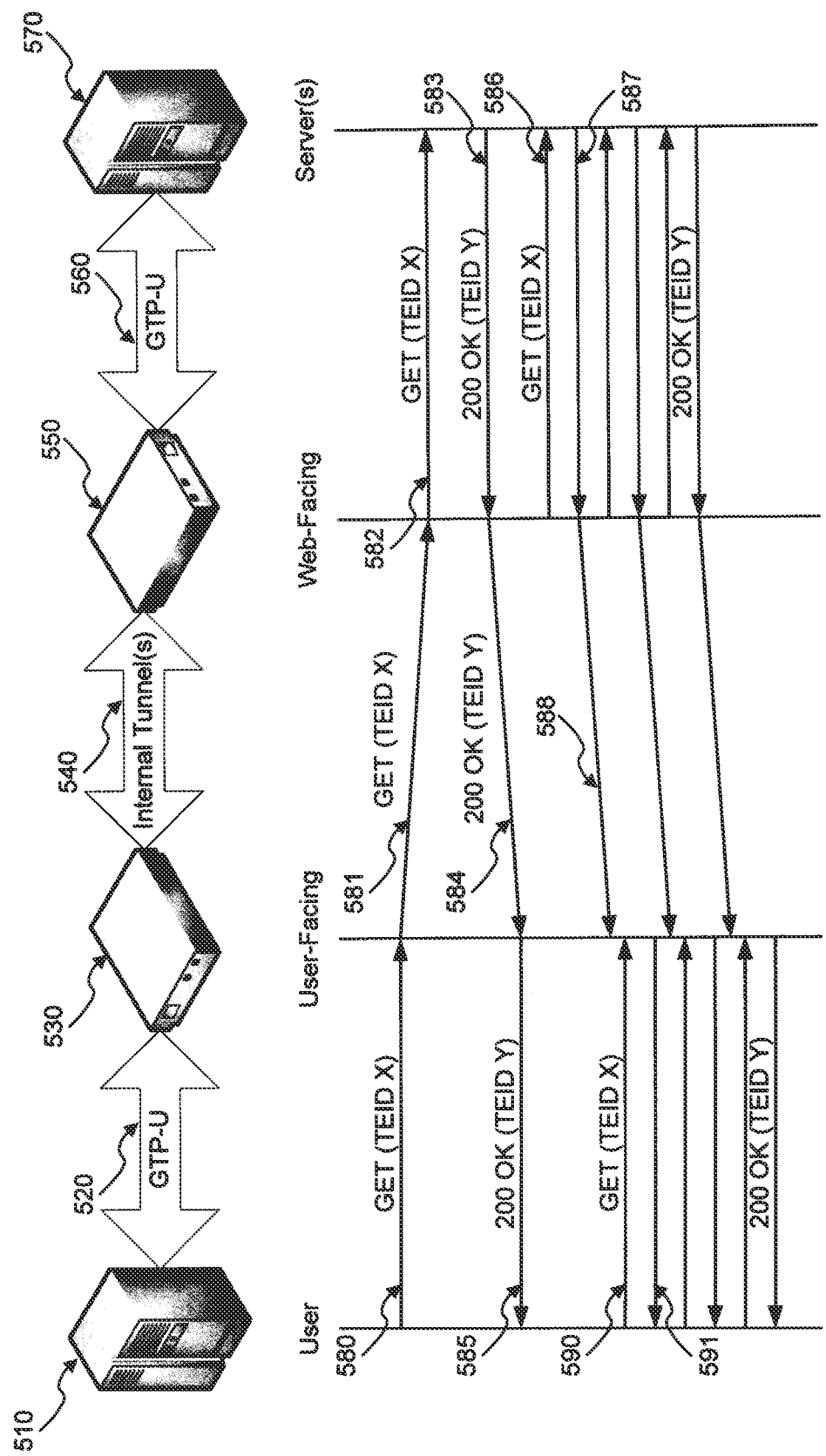
Figure 6:
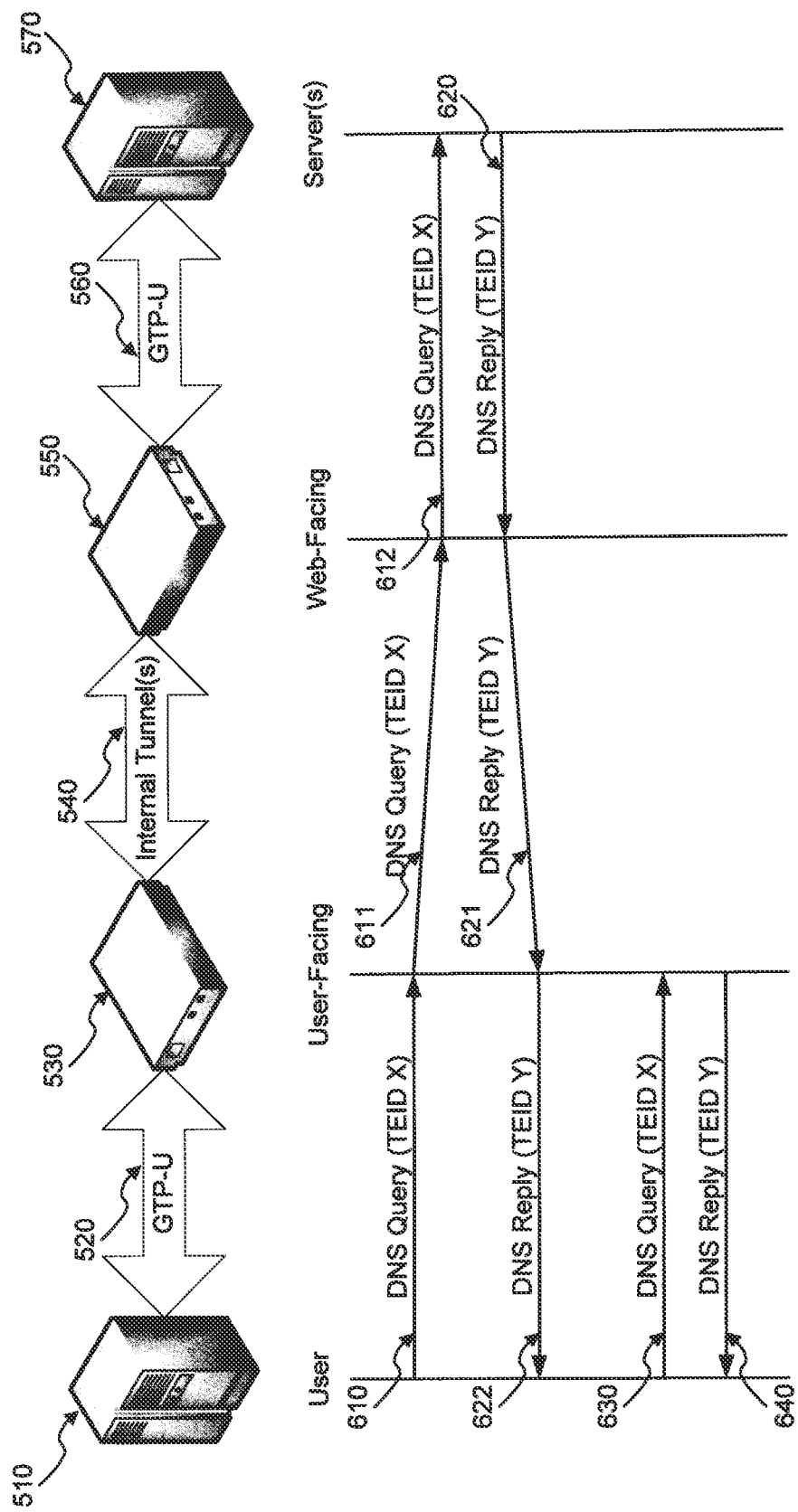

Having thus described the disclosure in general terms, reference will now be made to the accompanying drawings, which are not necessarily drawn to scale, and wherein:

FIG. 1 shows a communication system in accordance with aspects of the disclosure;

FIG. 2 shows a block diagram of an example sender station in accordance with aspects of the disclosure;

FIG. 3 shows a sender station and a receiver station in accordance with aspects of the disclosure;

FIG. 4 shows a GTP header format in accordance with aspects of the disclosure;

FIG. 5 shows an example of an HTTP session in accordance with aspects of the disclosure; and FIG. 6 shows an example of DNS sessions in accordance with aspects of the disclosure.

DETAILED DESCRIPTION

Referring to FIG. 1, communication system 100 may comprise at least one user equipment device (e.g., a UE) (110), at least one access point (e.g., an eNodeB) (120) and at least one core network device (e.g., an evolved packet core (EPC)) (160). The at least one access point (120) and the at least one core network device (160) may be configured to communicate, at least with each other, using one or more tunnels (190) corresponding to the GPRS Tunneling Protocol (GTP). In some embodiments, said one or more tunnels (190) may correspond to the data user part of the GTP (GTP-U). While the terms used in the above examples may be derived from specific cellular communication technologies (e.g., the 3rd Generation Partnership Project (3GPP), Long Term Evolution (LTE), etc.) system 100 may represent various other types of cellular communication networks, as well as other types of wireless communication networks.

In some embodiments, the at least one access point (120) and the at least one core network device (160) may be geographically separated and the one or more GTP tunnels (190) used by the at least one access point (120) and the at least one core network device (160) may be carried over one or more high latency links. In the example shown in FIG. 1, such a high latency link is represented by a satellite link. The satellite link may comprise at least a first satellite modem (130) and a second satellite modem (150), wherein the first satellite modem (130) and the second satellite modem (150) may be configured to communicate, at least with each other, via a satellite (140), for example, using appropriate transmission and reception means (e.g., 135 and 155 corresponding to the first satellite modem (130) and the second satellite modem (150), respectively). The first satellite modem (130) may be configured to be coupled to (170) the at least one access point (120) and may be referred to as a user-facing station. The second satellite modem (150) may be configured to be coupled to (180) the at least one core network device (160) and may be referred to as a web-facing station (e.g., since the at least one core network device (160), which may be coupled to the second satellite modem (150), may be configured to enable access to web servers, SIP servers, DNS servers, data centers, Intranet servers, and/or any other type of network or servers).

In some embodiments, system 100 may comprise a plurality of access points. In such embodiments, each access point may be coupled to a satellite modem configured to communicate with one or more satellite modems coupled to the at least one core network device (160). In some embodiments, each satellite modem coupled to an access point may be associated with a very small aperture terminal (VSAT) and the satellite modems coupled to the at least one core network device (160) may be replaced by or correspond to a satellite communication hub coupled to the at least one core network device (160).

Since GTP tunnels may be unidirectional, each GTP tunnel in system 100 may be associated with a sender station and a receiver station. FIG. 3 shows a first network device (350) (e.g., an access point or a core network device) coupled to a sender station (200), and a second network device (360) (e.g. a core network device or an access point) coupled to a receiver station (300). The first network device (350) may be configured to send information to the second network device (360) via at least one GTP tunnel (390). The sender station (200) may be configured to receive from the first network device (350) a packet comprising data encapsulated in accordance with the GTP-U (310), perform one or more methods in accordance with a protocol and/or an application associated with the packet to produce a corresponding packet, and transmit the corresponding packet to the receiver station (300), for example, over a high latency link (e.g., via a satellite). In some embodiments, the sender station (200) may be configured to transmit and the receiver station (300) may be configured to receive the corresponding packet via an internal tunnel (320) established between the sender station (200) and the receiver station (300), which may correspond to the at least one GTP tunnel (390). The receiver station (300) may be configured to receive the packet produced by the sender station (200) over the high latency link (e.g., via the satellite), perform one or more methods in accordance with the received packet to produce a corresponding packet, and transmit the packet it produces to the second network device (360) using the GTP-U (330). In some embodiments, the packet produced by the receiver station (300) may correspond to the internal tunnel (320) through which the packet was transmitted by the sender station (200) and received by the receiver station (300). In some embodiments, the first satellite modem (130) and/or the second satellite modem (150) may comprise both a sender station (200) and a receiver station (300) for at least the purpose of transmitting and receiving traffic encapsulated using the GTP-U.

In some embodiments, the internal tunnel (320) may be encrypted. For example, the packet received by the sender station (200) may comprise unencrypted data, and the sender station (200) may be configured to produce a corresponding packet as previously described and encrypt the packet (or data contained therein) in accordance with an encryption scheme prior to transmitting the packet to the receiver station (300). The receiver station (300) may be configured to receive the packet produced by the sender station (200), decrypt the packet (or data contained therein) in accordance with the encryption scheme, produce a corresponding packet as previously described, which may comprise the decrypted packet (or data contained therein), and transmit the packet it produces to the second network device (360).

In some embodiments, the first network device (350) may be configured to send information to the second network device (360) via a plurality of different GTP tunnels, and the sender station (200) may be configured to transmit and/or the receiver station (300) may be configured to receive packets associated with the plurality of GTP tunnels over a plurality of different internal tunnels. Each internal tunnel of the plurality of internal tunnels may be associated with a corresponding GTP tunnel of the plurality of different GTP tunnels. In such embodiments, the sender station (200) may be configured to encrypt and/or the receiver station (300) may be configured to decrypt packets (or data contained therein) received or transmitted via an internal tunnel with an encryption key associated with the internal tunnel (e.g., the data transmitted and received via each of the plurality of different internal tunnels may be encrypted and decrypted using an encryption key that differs from encryption keys used to encrypt and decrypt data transmitted and received via the other internal tunnels).

In some embodiments, the packet (or data contained therein) received by the sender station (200) may be encrypted, and the sender station (200) may be configured to decrypt the packet (or data contained therein) and encrypt the corresponding packet it produces (or data contained therein) in accordance with a different encryption scheme (e.g., algorithm, key, or the like), for example, an encryption scheme associated with the internal tunnel (320). Additionally or alternatively, the receiver station (300) may be configured to encrypt the corresponding packet it produces in accordance with an encryption scheme that differs from the encryption scheme utilized by the sender station (200) to encrypt the packet (or data contained therein) communicated via the internal tunnel (320) and/or an encryption scheme in which the packet (or data contained therein) received by the sender station (200) may be encrypted.

FIG. 2 shows a block diagram of an example sender station 200 (e.g., the sender station 200 of FIG. 3). Sender station 200 may comprise a GTP module (210), one or more protocol specific and/or application specific processing modules (e.g., 220 to 280), and a satellite interface module (290). GTP module (210) may comprise a tunnels database (215). A receiver station (e.g., such as the receiver station 300 of FIG. 3) may be similar to the sender station 200 shown in FIG. 2, with the flows between the modules being reversed. For example, in a receiver station (e.g. 300), flow may be from a satellite interface module to one or more processing modules, from the one or more processing modules to a GTP module, and from the GTP module to a GTP-U interface). As previously described, a satellite modem (e.g., any of the first satellite modem (130) and the second satellite modem (150)), may comprise at least a sender station (e.g., 200) and a receiver station (300). In some embodiments, the satellite modem may be configured to comprise at least a single (unified) GTP module (210) and a single (unified) tunnels database (215) that may be common to both the sender station (200) and the receiver station (300), wherein at least the GTP module (210) may be configured both as a corresponding sender station module and as a corresponding receiver station module. In some embodiments, the satellite modem may be configured to have unified application specific and/or protocol specific modules (e.g., 220 to 280) and/or a unified satellite interface module (290) that may be common to both the sender station (200) and the receiver station (300), wherein each of the unified modules may be configured both as a corresponding sender station module and as a corresponding receiver station module. Therefore, references made herein to the modules shown in FIG. 2 may refer to the sender station (200) or the receiver station (300) according to the context, unless otherwise specifically indicated.

The GTP module (210) may be configured to use the tunnels database (215) for at least the purpose of storing information corresponding to one or more GTP tunnels that the GTP module (210) may be configured to detect. The GTP module (210) may be configured to store in the tunnels database (215), for each of the one or more GTP tunnels, a tunnel endpoint identifier (TEID) corresponding to the respective GTP tunnel. In some embodiments, for example, a sender station (200) may be configured to be coupled to multiple network devices (e.g., access points or core network devices) wherein two or more of the multiple network devices may use a same TEID value for their respective GTP tunnels. In such embodiments, it might not be possible for the GTP module (210) of the sender station (200) to uniquely identify a GTP tunnel based only on a TEID value. Thus, in such embodiments, for at least the purpose of uniquely identifying each of the one or more GTP tunnels, the GTP module (210) may be configured to store in the tunnels database (215), for at least one GTP tunnel of the one or more GTP tunnels, additional information elements that may correspond to the at least one GTP tunnel, including, for example, a source Internet Protocol (IP) address, destination IP address, Virtual Local Area Network (VLAN) identifier, and/or source UDP port number. In some embodiments, the additional information elements that may correspond to the at least one GTP tunnel may further include any of a source Media Access Control (MAC) address and/or a destination MAC address (for example, a source Ethernet address and/or a destination Ethernet address).

In some embodiments, the GTP module (210) of a sender station (200) may be configured to receive one or more packets (for example, from a first network device (350) that may be coupled to the sender station (200)) and to determine that at least one of the one or more packets may be carried in a GTP tunnel (e.g., 390). In some embodiments, the GTP module (210) of the sender station (200) may be configured to determine that the at least one packet (e.g., of the one or more received packets) may be carried in a GTP tunnel (390) by determining that the at least one packet may be received in accordance with the user datagram protocol (UDP) and that the at least one packet may be associated with a destination UDP port number of 2152. The GTP module (210) of the sender station (200) may be further configured, upon determining that the at least one packet may be carried in a GTP tunnel, to at least parse a GTP header corresponding to (or included in) the at least one packet and to extract from the GTP header corresponding to the at least one packet at least a tunnel endpoint identifier (TEID).

In accordance with the GTP-U, in order to establish a GTP tunnel between a source GTP endpoint and a destination GTP endpoint (e.g., an access point and/or a core network device) having a corresponding source IP address and a destination IP address respectively (and using a destination UDP port number 2152), Echo Request and Echo Response messages (echo packets) may be exchanged between the GTP endpoints. These echo packets may include an invalid tunnel endpoint identifier (e.g., their TEID may be set to 0). In some embodiments, the GTP module (210) of the sender station (200) may be configured to determine whether a received packet includes a valid (e.g., non-zero) TEID and to determine that the received packet may not be associated with or carried in any GTP tunnel upon determining that the received packet includes an invalid TEID. The GTP module (210) of the sender station (200) may be configured, upon determining that a packet may not be associated with or carried in any GTP tunnel, to forward the received packet at least to the satellite interface module (290) while bypassing (217) at least the application specific processing modules (e.g., 220 to 280). Thus, the sender station (200) may be configured to transparently transmit GTP tunnel establishment messages (e.g., echo packets) at least to a corresponding receiver station (e.g., 300).

The GTP module (210) of the sender station (200) may be further configured, upon extracting a TEID from a GTP header corresponding to the at least one packet, to determine whether the at least one packet may be a first packet of one or more packets that may be associated with a GTP tunnel corresponding to the extracted TEID. The GTP module (210) of the sender station (200) may be configured to determine whether the at least one packet (of the one or more received packets) may be a first packet associated with a GTP tunnel by searching the tunnels database (215) for a record comprising a TEID value corresponding to the at least one packet, wherein the at least one packet may be determined to be a first packet associated with a GTP tunnel if no record including the TEID value is found in the tunnels database (215). The GTP module (210) of the sender station (200) may be configured, upon determining that the at least one packet is a first packet associated with a GTP tunnel, to add a new record corresponding to the GTP tunnel to the tunnels database (215), wherein the new record may include at least the TEID value corresponding to the at least one packet.

As previously mentioned, in some embodiments the GTP module (210) of the sender station (200) may be configured to extract from the at least one packet additional information elements corresponding to the at least one packet, for example, source MAC address, destination MAC address, a source IP address, destination IP address, Virtual Local Area Network (VLAN) identifier, and/or source UDP port number. In such embodiments, the GTP module (210) of the sender station (200) may be further configured to determine whether the at least one packet (of the one or more received packets) may be a first packet associated with a GTP tunnel by searching the tunnels database (215) for a record comprising a TEID value and values of any of the additional information elements corresponding to the at least one packet, wherein the at least one packet may be determined to be a first packet associated with a GTP tunnel if no record including the TEID value and the values of any of the additional information elements may be found in the tunnels database (215). The GTP module (210) of the sender station (200) may be configured to, upon determining that the at least one packet is a first packet that may be associated with a GTP tunnel, add a new record corresponding to the GTP tunnel to the tunnels database (215), wherein the new record may include at least the TEID value and the values of any of the additional information elements corresponding to the at least one packet.

Furthermore, the GTP module (210) of the sender station (200) may be configured, upon determining that the at least one packet (of the one or more received packets) may be a first packet associated with a GTP tunnel (390), to establish an internal tunnel (320) between the sender station (200) (e.g., of a first satellite modem) and (a GTP module of) a receiver station (300) (e.g., of a second satellite modem), wherein the internal tunnel (320) may correspond to the GTP tunnel (390) corresponding to the at least one packet. In some embodiments, wherein for example system 100 may comprise a plurality of receiver stations (satellite modems), the GTP module (210) of the sender station (200) may be configured to determine the receiver station (satellite modem) that corresponds to the at least one packet (e.g., in accordance with a destination IP address associated with the at least one packet) and establish the internal tunnel (320) with the determined receiver station (300). In some embodiments, the GTP module (210) of the sender station (200) may be configured to establish the internal tunnel (320) with the (GTP module of the) receiver station (300) by sending a session establishment message over the link (e.g., a high latency link) connecting the sender station (200) (e.g., of the first satellite modem) and the receiver station (300) (e.g., of the second satellite modem), wherein the session establishment message may include at least the TEID value corresponding to the GTP tunnel (390). The GTP module of the receiver station (300) may be configured to, upon receiving a GTP session establishment message, store one or more session parameters provided in the received GTP session establishment message in a tunnels database (e.g., similar to tunnels database (215) of the sender station (200) or unified with a tunnels database (215) of a sender station (200) that may be included in the same satellite modem).

In some embodiments, the GTP module (210) of the sender station (200) may be configured to include in a session establishment message additional information elements corresponding to (the at least one packet associated with) the GTP tunnel (390), for example, in addition to the TEID value corresponding to the GTP tunnel (390). The additional information elements may include, for example, a GTP version indicator (e.g., as it may be included in a GTP header of the at least one packet), an internal TEID index, source IP address, destination IP address, Virtual Local Area Network (VLAN) identifier, and/or source UDP port number. In some embodiments, the additional information elements may further include any of a source MAC address and/or a destination MAC address, e.g., for at least the purpose of enabling reconstruction of a MAC header by the receiver station (300). In some embodiments, an internal TEID index included in a GTP session establishment message may be used by the sender station (200) and/or by the receiver station (300), after the internal tunnel (320) has been established, for example, to reference the internal tunnel (320) or for overhead (header size) reduction. It may be noted that information elements such as TEID, GTP version, internal TEID index, source MAC address, destination MAC address, source IP address, destination IP address, VLAN identifier and/or source UDP port may be constant for as long as the corresponding GTP tunnel (390) may be open, thus including them in a GTP session establishment message may allow header compression for any subsequent packets that may be transmitted via the GTP tunnel (390) and/or processed by the sender station (200) and/or the receiver station (300).

In some embodiments, wherein the internal tunnel (320) may be encrypted, the session establishment message may include information corresponding to an encryption key used for encrypting packets (or data contained therein) sent over the internal tunnel (320). In some embodiments, such information may be exchanged using another protocol (e.g., rather than in a session establishment message), for example, using a key exchange algorithm that the sender station (200) and/or the receiver station (300) are configured to support.

In some embodiments, for example, wherein various resources (e.g., storage capacity, processing power, etc.) that may be associated with any of the sender station (200) and/or the receiver station (300) may be limited, the sender station (200) and/or the receiver station (300) may be configured to support a procedure for a teardown of an internal tunnel (320). In some embodiments, the GTP module (210) of the sender station (200) may be configured to send a session closing message to the (GTP module of the) receiver station (300) for at least the purpose of tearing down an internal tunnel (320), wherein the session closing message may comprise at least an internal TEID index corresponding to the internal tunnel (320) being torn down. The GTP module (210) of the sender station (200) may be configured to send a session closing message to the (GTP module of the) receiver station (300) upon, for example, determining that no packets associated with the corresponding GTP tunnel (390) have been received for a predefined period of time, or receiving a packet associated with the corresponding GTP tunnel (390) that comprises an end marker. The sender station (200) and/or the receiver station (300) may be configured, upon tearing down an internal tunnel (e.g., 320), to further tear down sessions associated with the corresponding GTP tunnel (390), including, for example, transmission control protocol (TCP) connections (e.g., by using TCP reset), sessions established using the Session Initiation Protocol (SIP), and/or Real-time Transport Protocol (RTP) sessions. The GTP module (210) of the sender station (200) and/or the GTP module of the receiver station (300) may be configured, upon tearing down an internal tunnel (e.g., 320), to delete records corresponding to the respective GTP tunnel (390) from the tunnels database (215).

As previously described, the GTP module (210) of the sender station (200) may be configured to receive one or more packets (e.g., from a first network device (350) that may be coupled to the sender station (200)), determine that at least one of the one or more packets may be carried in a GTP tunnel (e.g., 390), parse a GTP header corresponding to (or included in) the at least one packet, and extract from the GTP header at least a tunnel endpoint identifier (TEID). The GTP module (210) of the sender station (200) may be further configured, based on at least the extracted TEID (and in some embodiments based also on additional information elements, as previously described), to associate the at least one packet with an internal tunnel (e.g., 320) and/or with an internal TEID index, for example, either by establishing a new internal tunnel with a respective receiver station (300) (e.g., if the at least one packet may be the first packet of one or more packets associated with the corresponding GTP tunnel (e.g., 390)) or by association to an already established internal tunnel (e.g., if the at least one packet may not be the first packet associated with the corresponding GTP tunnel).

In accordance with aspects of the disclosure, the GTP module (210) of the sender station (200) may be further configured to, upon parsing the GTP header corresponding to the at least one packet, determine (e.g., based on the GTP header) a packet type that may be associated with the at least one packet, and parse a protocol data unit (PDU) corresponding to (or included in) the at least one packet if the packet type is associated with a traffic packet type (e.g., T-PDU). The GTP module (210) of the sender station (200) may be configured to, upon parsing the PDU corresponding to the at least one packet, determine any of an application and/or a protocol that may be associated with the at least one packet, and classify the at least one packet, e.g., in accordance with the determined application and/or protocol, into a class corresponding to one of the protocol specific and/or application specific modules (e.g., 220 to 280) of the sender station (200), including, for example, a TCP class, HTTP over TCP class, Domain Name System (DNS) class, Voice over Internet Protocol (VoIP) class, and/or a jitter- and/or delay-sensitive-traffic class. In some embodiments, the GTP module (210) of the sender station (200) may be configured to classify the at least one packet to a jitter- and/or delay-sensitive-traffic class based on, for example, a protocol type (e.g., UDP, Stream Control Transmission Protocol (SCTP), or Internet Control Message Protocol (ICMP)), source IP address, destination IP address, source port number, destination port number, Differentiated Services Code Point (DSCP), type of service (TOS) marking, or VLAN tag.

The GTP module (210) of the sender station (200) may be configured to, upon classifying the at least one packet, generate a corresponding packet from the at least one packet by at least removing from the at least one packet a MAC header, an IP header, a UDP header, and/or a GTP header and adding an information block comprising at least an internal TEID index corresponding to the internal tunnel (320) with which the at least one packet is associated. In some embodiments, the added information block may further comprise additional information items that may be extracted from any of the removed headers, for example, the additional information items may comprise differing values between packets associated with the corresponding GTP tunnel (390). The GTP module (210) of the sender station (200) may be configured to, upon generating the corresponding packet, forward the corresponding packet to any of the protocol specific and/or application specific modules (e.g., 220 to 280), for example, in accordance with a class previously associated with the at least one packet, for at least the purpose of further processing the corresponding packet (e.g., in accordance with the respective application and/or protocol). The sender station (200) may be configured to, upon completing any processing of the corresponding packet by any of the protocol specific and/or application specific modules (e.g., 220 to 280), generate a packet (e.g., in accordance with said processing), and forward the packet to the satellite interface module (290) of the sender station (200) for transmission (e.g., over a satellite link) to the respective receiver station (300).

The receiver station (300) may be configured to receive (e.g., via a satellite interface of the receiver station (300)) the packet transmitted by the sender station (200), associate the packet with an internal tunnel (320), for example, based on an internal TEID index included in the packet and corresponding to the internal tunnel (320), generate (e.g., in accordance with a protocol and/or an application associated with the packet) a corresponding packet, generate (e.g., at the GTP module of the receiver station) at least in accordance with the corresponding packet a packet for transmission to the second network device (360), for example, by reconstructing an IP header, UDP header, and/or GTP header (e.g., in accordance with the GTP tunnel (390) corresponding to the internal tunnel (320)), and transmit said packet to the second network device (360) using the GTP-U (330). In some embodiments, said reconstructing may further include reconstructing a MAC header (e.g., an Ethernet header) in accordance with the GTP tunnel (390), e.g., for at least the purpose of providing fully transparent connectivity between the first network device (350) and the second network device (360). In some embodiments, the packet transmitted by the receiver station (300) to the second network device (360) may be similar to the at least one packet received by the sender station (200) from the first network device (350) (e.g., any differences that may exist do not affect the GTP tunnel (390) between the first network device (350) and the second network device (360)).

In some embodiments, the GTP module (210) of the sender station (200) may be configured to apply GTP tunnel header compression to received packets associated with a GTP tunnel (e.g., 390). The headers being compressed may include an IP header, UDP header, and/or GTP header associated with the GTP tunnel (390). In some embodiments, the headers being compressed may further include one or more MAC headers (e.g., one or more Ethernet headers) associated with the GTP tunnel (390). The GTP tunnel header compression (e.g., compression of headers associated with a GTP tunnel) may be applied independently of any additional header compression that may be applied to packets received via the GTP tunnel, for example, compression associated with specific protocols and/or applications (e.g., TCP header compression, RTP header compression, etc.).

As previously described, the GTP module of the sender station (200) may be configured to, upon generating the packet corresponding to the at least one received packet, remove a MAC header, an IP header, UDP header, and/or GTP header and add an information block comprising at least an internal TEID index corresponding to an internal tunnel associated with the at least one packet. The added information block may further comprise an indication that the corresponding packet may be GTP tunnel header compressed. The GTP module of a corresponding receiver station (300) may be configured to, upon generating a corresponding packet, determine that the packet is GTP tunnel header compressed and reconstruct the IP header, UDP header, and/or a GTP header. In some embodiments, said reconstructing may additionally or alternatively include reconstructing a MAC header. The GTP module of the sender station (200) and/or the GTP module of the receiver station (300) may be so configured for at least the purpose of avoiding transmission (e.g., over a satellite link) of the MAC header, IP header, UDP header, and/or GTP header, for example, for each packet associated with the respective GTP tunnel (e.g., 390). At least for the purpose of allowing the receiver station (300) to reconstruct the MAC header, IP header, UDP header, and/or GTP header, the GTP module (210) of sender station (200) and/or the corresponding GTP module of the receiver station (300) may be configured to exchange information elements corresponding to the MAC header, IP header, UDP header, and/or GTP header of at least one packet associated with a respective GTP tunnel (e.g. 390) while establishing the respective internal tunnel (e.g., 320), wherein such exchange may not include information elements that may vary in value throughout the existence duration of the internal tunnel (320). In some embodiments, the GTP module (210) of sender station (200) and/or the corresponding GTP module of the receiver station (300) may be configured to exchange information elements that may not be constant throughout the duration of existence of the internal tunnel (320) in accordance with a protocol that may be used by the GTP module (210) of sender station (200) and/or the corresponding GTP module of the receiver station (300).

In some embodiments, the GTP module (210) of sender station (200) and/or the GTP module of the receiver station (300) may be configured to exchange information elements associated with a MAC header, an IP header (e.g., a source IP address, destination IP address, etc.) and/or with a UDP header as part of establishing an internal tunnel (320). The GTP module of the receiver station (300) may be configured to reconstruct or locally generate the information elements associated with a MAC header, an IP header and/or a UDP header, e.g., in accordance with said exchange, excepting IP header information elements associated with packet fragmentation and/or IP header information elements associated with DSCP. In some embodiments, for TCP connections and RTP sessions, the GTP module (210) of sender station (200) and/or the GTP module of the receiver station (300) may be configured to exchange IP header information elements that may be associated with DSCP once per each connection or session respectively, e.g., upon connection initialization (TCP) or session establishment (RTP).

FIG. 4 shows an example format of a GTP header. In some embodiments, the GTP module (210) of sender station (200) and/or the GTP module of the receiver station (300) may be configured to exchange a GTP version and TEID information elements associated with a GTP header, e.g., as part of establishing an internal tunnel (320). The GTP module of the receiver station (300) may be configured to reconstruct or locally generate the protocol type (PT) field, the message type field (e.g., only traffic PDU packets may be subjected to header compression), the length field, and/or the sequence number field. The GTP module (210) of sender station (200) and/or the GTP module of the receiver station (300) may be configured to transmit and/or receive respectively (e.g., over a satellite link) the sequence number indicator field (S). The GTP module (210) of sender station (200) may be configured to not compress a GTP header (e.g., transmit it as it is received) and/or the GTP module of the receiver station (300) may be configured to receive an uncompressed GTP header, if the next extension indicator field (E) and/or the N-PDU indicator field (PN) is set (e.g., thus transmitting the corresponding fields that may be indicated by these indicators from the sender station (200) to the receiver station (300)).

In some embodiments, GTP tunnel header compression may be applied to packets that may not be associated with any of the one or more classes corresponding to the one or more protocol specific and/or application specific modules (e.g., 220 to 280), for example, to packets that may not be associated with any stream or connection (e.g., ICMP packets, UDP packets not falling into any of the one or more classes, etc.). The GTP module (210) of the sender station (200) may be configured to determine that at least one packet (e.g., of one or more received packets) may not be associated with any of the one or more said classes, generate a packet corresponding to the at least one packet, for example, by applying GTP tunnel header compression (e.g., as previously described) to the at least one packet, wherein the corresponding packet may comprise an information block comprising an internal TEID index (e.g., corresponding to an internal tunnel associated with the at least one packet), an indication that the corresponding packet may be GTP tunnel header compressed, and/or an indication that the corresponding packet may not be associated with any of the one or more said classes, and forward the corresponding packet to the satellite interface module (290) of the sender station (200) while bypassing (217) the protocol specific/application specific modules (e.g., 220 to 280) of the sender station (200). The receiver station (300) may be configured to determine that a packet received via a satellite interface module (e.g., of the receiver station (300)) may not be associated with any of the one or more classes corresponding to the one or more protocol specific and/or application specific modules of the receiver station (300) and forward the received packet to the GTP module of the receiver station (300) while bypassing all the protocol specific and/or application specific modules (e.g., of the receiver station (300)). The GTP module may be configured to determine that the received packet may be GTP tunnel header compressed and reconstruct the headers as previously described.

In some embodiments, the satellite modem may be configured to accelerate TCP traffic encapsulated inside one or more GTP tunnels, for example, using the sender station (200) and the receiver station (300) of the satellite modem.

Acceleration of TCP traffic may include spoofing of acknowledgements. For example, a sender station (200) of a first satellite modem may be configured to receive (e.g., from a first network device coupled to the first satellite modem) a TCP segment encapsulated inside a first GTP tunnel and transmit (e.g., to the first network device) an acknowledgement for the TCP segment, wherein the sender station (200) of the first satellite modem may be configured to transmit the acknowledgement for the TCP segment before a corresponding acknowledgement for the TCP segment may be received (e.g., over a satellite link), for example, by the receiver station (300) of the first satellite modem from the destination of the TCP segment (e.g., from a second network device that may be coupled to a second satellite modem). Since GTP tunnels are unidirectional, an acknowledgement for the TCP segment may need to be sent on a second GTP tunnel, different from the first GTP tunnel (390).

In some embodiments, the sender station (200) of a first satellite modem may be configured to receive (e.g., from a first network device (350) that may be coupled to the first satellite modem) a TCP SYN segment that may be encapsulated in a first GTP tunnel (e.g., 390). The sender station (200) of the first satellite modem may be configured to associate a TCP connection (session) corresponding to the TCP SYN segment with the first GTP tunnel, wherein the first GTP tunnel may be a forward GTP tunnel for the TCP connection at the first satellite modem, store said association in a memory (e.g., in a tunnels database of a GTP module), and transmit the TCP SYN segment to the second satellite modem (e.g., using a first internal tunnel (e.g. 320) corresponding to the first GTP tunnel (e.g., 390)). In some embodiments, if the first internal tunnel corresponding to the first GTP tunnel does not yet exist (e.g., at the time of receiving the TCP SYN segment), the sender station (200) of the first satellite modem may be configured to establish (e.g., with the receiver station (300) of the second satellite modem) the first internal tunnel corresponding to the first GTP tunnel (e.g., as previously described), and transmit the TCP SYN segment to the second satellite modem after the first internal tunnel has been established. The receiver station (300) of the second satellite modem may be configured to receive (e.g., from the first satellite modem) at least the TCP SYN segment, associate the TCP connection (session) corresponding to the TCP SYN segment with the first GTP tunnel, wherein the first GTP tunnel may be a return GTP tunnel for the TCP connection at the second satellite modem, store said association in a memory (e.g., in a tunnels database of a GTP module), and transmit the TCP SYN segment (e.g., to a second network device (360) that may be coupled to the second satellite modem).

The sender station (200) of the second satellite modem may be configured to receive (e.g., from the second network device (360)), a TCP SYN-ACK that may be encapsulated in a second GTP tunnel, wherein the TCP SYN-ACK may correspond to the TCP SYN segment. The sender station (200) of the second satellite modem may be configured to associate the TCP connection (session) corresponding to the TCP SYN-ACK with the second GTP tunnel, wherein the second GTP tunnel may be a forward GTP tunnel for the TCP connection at the second satellite modem, store said association in a memory (e.g., in a tunnels database of a GTP module), and transmit the TCP SYN-ACK to the first satellite modem (e.g., using a second internal tunnel corresponding to the second GTP tunnel). In some embodiments, if the second internal tunnel corresponding to the second GTP tunnel does not yet exist (e.g., at the time of receiving the TCP SYN-ACK), the sender station (200) of the second satellite modem may be configured to establish (e.g., with the receiver station (300) of the first satellite modem) the second internal tunnel corresponding to the second GTP tunnel and transmit the TCP SYN-ACK to the first satellite modem after the second internal tunnel has been established. The receiver station (300) of the first satellite modem may be configured to receive (e.g., from the second satellite modem) the TCP SYN-ACK, associate the TCP connection (session) corresponding to the TCP SYN-ACK with the second GTP tunnel, wherein the second GTP tunnel may be a return GTP tunnel for the TCP connection at the first satellite modem, store said association in a memory (e.g., in a tunnels database of a GTP module), and transmit the TCP SYN-ACK (e.g., to the first network device (350)).

In some embodiments, the sender station (200) and/or the receiver station (300) of the first satellite modem and/or the second satellite modem may be configured to modify (e.g., by using a TCP module included in the sender station (200) or the receiver station (300)) a TCP SYN segment and/or a TCP SYN-ACK before forwarding the TCP SYN segment and/or the TCP SYN-ACK. In such embodiments, modifying any of the TCP SYN segment and/or the TCP SYN-ACK may comprise at least any of adding a TCP option field that may be used for setting a maximum message size (MSS) for the respective TCP connection, and modifying a same TCP option field if a same TCP option field may already exist in the TCP SYN segment and/or in the TCP SYN-ACK (e.g., for at least the purpose of setting an MSS value for the respective TCP connection). The sender station (200) and/or the receiver station (300) may be configured to, upon modifying and/or adding a TCP option field used for setting an MSS for the respective TCP connection, determine a size (e.g., in octets/bytes) of a maximum transmission unit (MTU) of an IP packet that may correspond to a GTP tunnel corresponding to the respective TCP connection, calculate an MSS by deducting from the determined MTU size the sizes of anticipated headers (e.g., the sizes of an IP header, UDP header, and/or GTP header associated with the GTP-U and/or the sizes of an IP header and/or TCP header associated with TCP segment encapsulated in the GTP tunnel), and set an MSS for the respective TCP connection to a value smaller than or equal to the calculated MSS. In some embodiments, setting an MSS for the respective TCP connection as described above may prevent fragmentation of TCP segments (e.g., between multiple packets that may be encapsulated into a GTP tunnel corresponding to the respective TCP connection), thus perhaps enabling a simpler embodiment of a sender station (200) and/or a receiver station (300).

Once a TCP connection has been established, for example, end-to-end (e.g., between the first network device (350) and the second network device (360)), the first satellite modem and/or the second satellite modem may have associated the TCP connection with both a forward GTP tunnel and a backward GTP tunnel, respectively. The first satellite modem and/or the second satellite modem may be configured to, following establishment of the end-to-end TCP connection, receive (e.g., from a coupled network device) at least one TCP segment corresponding to the TCP connection, wherein the at least one TCP segment may be encapsulated in a forward GTP tunnel for the TCP connection at the respective satellite modem, generate an acknowledgement (e.g., a spoofed acknowledgement) for the at least one TCP segment, and transmit (e.g., to the coupled network device) the (spoofed) acknowledgement encapsulated in a return GTP tunnel for the TCP connection at the respective satellite modem. Furthermore, the first satellite modem and/or the second satellite modem may be configured to receive over a satellite link (e.g., from the second satellite modem and/or the first satellite modem, respectively) at least one packet comprising the at least one TCP segment (or data contained therein), and transmit a packet containing the received payload (e.g., the at least one TCP segment (or data contained therein)) to a network device coupled to the respective satellite modem, wherein the packet may be encapsulated in a return GTP tunnel for the TCP connection (e.g., associated with the at least one TCP segment) at the respective satellite modem. The first satellite modem and/or the second satellite modem may be further configured to receive an acknowledgement for the transmitted TCP segment in a forward GTP tunnel for the TCP connection at the respective satellite modem, record in association with the respective TCP connection one or more values corresponding to the received acknowledgement (e.g., for at least the purposes of managing (TCP) transmission windows and/or applying flow control), determine to drop the received acknowledgement (e.g., in accordance with a TCP acceleration policy), and drop the received acknowledgement without forwarding it to the satellite interface of the respective satellite modem.

In some embodiments, the GTP module (210) of the sender station (200) may be configured to receive a packet comprising a TCP segment encapsulated in a first GTP tunnel, associate the first packet with a first internal tunnel corresponding to the first GTP tunnel, classify the first packet into a TCP class, generate a corresponding packet (e.g., by applying GTP tunnel header compression as previously described), wherein the corresponding packet may be associated with an internal TEID index corresponding to the first internal tunnel, and forward the corresponding packet (e.g., in accordance with the TCP class into which the associated packet was classified) to a TCP module (220) of the sender station (200). In some embodiments, the corresponding packet may comprise at least the TCP segment included in the associated packet. The TCP module (220) of the sender station (200) may be configured to receive the corresponding packet, generate a packet based on the corresponding packet by replacing an IP header and/or TCP header corresponding to the TCP segment (e.g., that may be included in the corresponding packet) with a smaller header corresponding to a protocol configured to support TCP/IP header compression, and forward the packet to the satellite interface module (290) of the sender station (200) (e.g., for transmission to a respective receiver station (300)).

In some embodiments, the TCP module (220) of the sender station (200) may be configured to generate an acknowledgement (e.g., a spoofed acknowledgement) for the TCP segment included in the packet, wherein the (spoofed) acknowledgement may include an indication (e.g., an internal TEID index) of the internal tunnel that the (spoofed) acknowledgement may be associated with (e.g., a second internal tunnel corresponding to a return (second) GTP tunnel for the TCP connection associated with the TCP segment) and send the (spoofed) acknowledgement (e.g., via the GTP module (210) of the sender station as previously described). In some embodiments, the TCP module (220) of the sender station and/or the TCP module of a corresponding receiver station (300) may be further configured to indicate, for example, upon establishing a TCP connection (e.g., between the first network device (350) and the second network device (360)) a request to number TCP segments associated with the TCP connection (e.g., using the sequence number field of the GTP header (FIG. 4)), inside the GTP tunnels that correspond to the TCP connection (e.g., a forward and/or return GTP tunnel corresponding to the TCP connection). The TCP module (220) of the sender station may be further configured to determine that the TCP segment may be associated with a TCP connection established with a request to number TCP packets inside the corresponding GTP tunnel(s) and generate an acknowledgement (e.g., a spoofed acknowledgement) for the TCP segment comprising a sequence number indication (e.g., an indication to apply numbering inside the corresponding GTP tunnel). In such embodiments, the GTP module (210) of the sender station (200) may be further configured to determine that a packet to be encapsulated into a GTP tunnel has to be transmitted with a sequence number field in the GTP header (e.g., by determining that the packet may include a sequence number indication) and increase a sequence number associated with a corresponding GTP tunnel (e.g., upon encapsulating the packet into the GTP tunnel or transmitting the packet with a sequence number field present (e.g., in a GTP header)). In such embodiments, generating an acknowledgement (e.g., a spoofed acknowledgement) for the TCP segment may comprise incrementing by one a sequence number associated with a return GTP tunnel (e.g., a second GTP tunnel) corresponding to the TCP connection.

Furthermore, a TCP module of the receiver station (300) may be configured to receive at least the packet (e.g., via a satellite interface module of the receiver station (300)), wherein the packet may comprise a payload of the TCP segment, a (small) header corresponding to a protocol configured to support TCP/IP header compression, and an internal TEID index corresponding to a GTP tunnel (390) and/or an internal tunnel (320). The TCP module of the receiver station (300) may be further configured to generate a corresponding packet by reconstructing the IP header and/or TCP header (e.g., in accordance with the (small) header included in the received packet) and forward the corresponding packet to a GTP module of the receiver station (300). In some embodiments, the TCP module of the receiver station (300) may be further configured to determine whether the TCP segment is associated with a TCP connection established with a request to number TCP packets inside the corresponding GTP tunnel(s) and generate the corresponding packet to include a sequence number indication. The GTP module of the receiver station (300) may be configured to receive the corresponding packet, associate the corresponding packet with the respective internal tunnel (320) (e.g., in accordance with the internal TEID index), generate a packet encapsulating the corresponding packet into a GTP tunnel corresponding to the internal TEID index, wherein encapsulating the corresponding packet may include reconstructing the IP header, UDP header, and/or a GDP header corresponding to the first GTP tunnel, and transmit the packet (e.g., to a coupled network device). In some embodiments, said reconstructing may additionally or alternatively include reconstructing the MAC header corresponding to the first GTP tunnel. In some embodiments, the GTP module of the receiver station (300) may be further configured to determine whether the corresponding packet includes a sequence number indication and, if the corresponding packet includes a sequence number indication, generate a corresponding packet with a sequence number field in the GTP header and increase by one a sequence number associated with the GTP tunnel corresponding to the packet (e.g., the first GTP tunnel).

In some embodiments, the TCP module of the receiver station (300) may be configured to process TCP packets associated with a GTP tunnel (e.g., TCP packets received at a corresponding sender station (200) via a GTP tunnel) and TCP packets that may be unassociated with any GTP tunnel (e.g., TCP packets received unencapsulated by a satellite modem at the other side of a satellite link). In such embodiments, the TCP module of the receiver station (300) may be further configured to, upon receiving the packet, determine whether the packet includes an internal TEID index corresponding to a GTP tunnel and/or an internal tunnel, forward the corresponding packet to a GTP module of the receiver station (300) if the packet includes an internal TEID index and transmit the corresponding packet (e.g., to a coupled network device) if the packet does not include an internal TEID index.

In some embodiments, the satellite modem may be configured to accelerate HTTP traffic encapsulated inside one or more GTP tunnels, for example, using the sender station (200) and/or the receiver station (300) of the satellite modem.

Acceleration of HTTP traffic encapsulated inside one or more GTP tunnels may comprise a pre-fetching technique. For example, the pre-fetching technique may include anticipating a need for one or more objects and obtaining the one or more objects from one or more servers hosting the one or more objects before a user application issues a request for the one or more objects. Furthermore, since HTTP traffic is often carried over TCP, acceleration of TCP (e.g., as previously described) may also accelerate HTTP traffic.

Referring to FIG. 5, a user network device (510) may be coupled (e.g., using one or more GTP tunnels (520)) to a user-facing station (530), wherein the user-facing station (530) may be a first satellite modem (e.g., satellite modem 130 of FIG. 1). The user-facing station (530) may be configured to communicate, for example, over a high latency link (e.g. a satellite link) with a web-facing station (550), wherein the web-facing station (550) may be a second satellite modem (e.g., satellite modem 150 of FIG. 1). The web-facing station (550) may be coupled (e.g., using one or more GTP tunnels (560)), to one or more servers (570). In some embodiments, the user-facing station (530) and/or the web-facing station (550) may be configured to perform any of the methods previously described, including but not limited to extending the one or more GTP tunnels (520, 560) over a satellite link using one or more corresponding internal tunnels (540), applying GTP tunnel header compression to packets that may be received via the one or more GTP tunnels (520, 560), and accelerating TCP traffic that may be encapsulated in the one or more GTP tunnels (520, 560). In some embodiments, the user-facing station (530) and/or the web-facing station (550) may be configured to accelerate HTTP traffic encapsulated inside the one or more GTP tunnels (520, 560), for example, by using a pre-fetching technique.

The user-facing station (530) may be configured to receive (e.g., from a user network device (510)) a first request (580) for a first data object, wherein the first request (e.g., GET) may be included in one or more packets corresponding to the hypertext transfer protocol (HTTP) and encapsulated in a first GTP tunnel of the one or more GTP tunnels (520) associated with the user network device (510), and the first GTP tunnel of the one or more GTP tunnels (520) may be associated with a first TEID (e.g., TEID X). A GTP module of the user-facing station (530) may be configured to associate the one or more packets with an HTTP traffic class (e.g., as previously described) and to forward the one or more packets to an HTTP module of the user-facing station (530) (e.g., 230 in FIG. 2). The HTTP module of the user-facing station (530) may be configured to associate a pre-fetching session corresponding to the first request with the first GTP tunnel of the one or more GTP tunnels (520), wherein the first GTP tunnel of the one or more GTP tunnels (520) may be a forward GTP tunnel for the pre-fetching session at the user-facing station (530). The HTTP module of the user-facing station (530) may be further configured to store said association in a memory and transmit the first request (581) to the web-facing station (550) (e.g., using a first internal tunnel (540) corresponding to the first GTP tunnel of the one or more GTP tunnels (520)). The web-facing station (550) may be configured to receive (e.g., from the user-facing station (530) and/or over the first internal tunnel (540)) at least the first request (581), associate a pre-fetching session corresponding to the first request (581) with a first GTP tunnel of the one or more GTP tunnels (560) associated with the one or more servers (570), wherein the first GTP tunnel of the one or more GTP tunnels (560) may be a return GTP tunnel for the pre-fetching session at the web-facing station (550). The web-facing station (550) may be further configured to store said association in a memory and transmit the first request (582) to a web server (e.g., of the one or more web servers (570)) coupled to the web-facing station (550), for example, over the first GTP tunnel of the one or more GTP tunnels (560).

The web-facing station (550) may be configured to receive (e.g., from the web server) a first response (583) corresponding to the first request (582), the first response (583) comprising one or more packets corresponding to the hypertext transfer protocol (HTTP) and encapsulated in a second GTP tunnel of the one or more GTP tunnels (560) associated with the one or more servers (570), wherein the second GTP tunnel of the one or more GTP tunnels (560) is associated with a second TEID (e.g., TEID Y). In some embodiments, the first response (583) may comprise a 200 OK response. In some embodiments, the first response (583) may comprise another type of response (or acknowledgement) sent by the web server in response to the first request (582). In some embodiments, the first response (583) may include the first data object corresponding to the first request (e.g., 580, 581, and 582).

An HTTP module of the web-facing station (550) may be configured to associate the pre-fetching session corresponding to the first request with the second GTP tunnel of the one or more GTP tunnels (560) associated with the one or more servers (570), wherein the second GTP tunnel of the one or more GTP tunnels (560) may be a forward GTP tunnel for the pre-fetching session at the web-facing station (550). In some embodiments, the web-facing station (550) may have already associated the pre-fetching session with the second GTP tunnel prior to receiving the first response (583), for example, due to previously receiving an acknowledgement corresponding to the TCP protocol that underlies the HTTP protocol, wherein that acknowledgement may correspond, for example, to a TCP segment comprising the first request (581). The HTTP module of the web-facing station (550) may be further configured to store said association in a memory (e.g., associated with an HTTP module of the web-facing station (550)) and transmit the first response (584) to the user-facing station (530) (e.g., using a second internal tunnel (540) corresponding to the second GTP tunnel of the one or more GTP tunnels (560)). The user-facing station (530) may be configured to receive (e.g., from the web-facing station (550) and/or over the second internal tunnel (540)) at least the first response (584) and associate the pre-fetching session corresponding to the first request (581) with a second GTP tunnel of the one or more GTP tunnels (520) associated with the user network device (510), wherein the second GTP tunnel of the one or more GTP tunnels (520) may be a return GTP tunnel for the pre-fetching session at the user-facing station (530). The user-facing station (530) may be further configured to store said association in a memory and transmit the first response (585) to the user device (510), for example, over the second GTP tunnel of the one or more GTP tunnels (520).

Following the exchange of the first request (580) and the first response (583), as described above, the user-facing station (530) and/or the web-facing station (550) may have associated a pre-fetching session corresponding to the first request and/or the first response with the corresponding first and second GTP tunnels (TEID X and TEID Y) at each of the respective stations (530, 550). Thus, after said association, the user-facing station (530) and/or the web-facing station (550) may use the pre-fetching session for at least the purpose of accelerating retrieval of one or more subsequent objects associated with the first data object corresponding to the first request (580). In some embodiments, the above-described method of associating a pre-fetching session with corresponding first and second GTP tunnels (e.g., TEID X and TEID Y) at each of the respective stations (530, 550) may be repeated when the user-facing station (530) receives (e.g., from a user network device (510)) a request for a data object that may not be associated with an active pre-fetching session.

In some embodiments, the HTTP module of the web-facing station (550) may be configured to, upon receiving the first data object from the web server and/or sending the first data object (e.g., 584) to the user-facing station (530), to parse the first data object and determine whether the first data object comprises links to one or more additional data objects associated with the first data object. The HTTP module of the web-facing station (550) may be further configured to, upon determining that the first data object comprises one or more links to one or more additional data objects, send to the web server (570) one or more additional requests (e.g., 586) for the one or more additional data objects, wherein the web-facing station (550) may be configured to send the one or more additional requests (e.g., 586) encapsulated in the first GTP tunnel of the one or more GTP tunnels (560)) associated with the one or more servers (570) (e.g., using TEID X). The HTTP module of the web-facing station (550) may be further configured to receive at least one data object of the one or more additional data objects (e.g., 587), wherein the at least one data object of the one or more additional data objects may be encapsulated in the second GTP tunnel of the one or more GTP tunnels (560) (e.g., TEID Y) and transmit the at least one data object of the one or more additional data objects (e.g., 588) to the user-facing station (530) using the second internal tunnel (540) corresponding to the second GTP tunnel of the one or more GTP tunnels (560).

The HTTP module of the user-facing station (530) may be configured to, upon receiving the at least one data object of the additional data objects (e.g., 588) over the second internal tunnel (540), to associate the at least one data object of the additional data objects with the pre-fetching session corresponding to the first request (580) and store the received at least one data object of the additional data objects in a memory of the user-facing station (530). The HTTP module of the user-facing station (530) may be further configured to receive (e.g., from the user network device (510) and over the first GTP tunnel of the one or more GTP tunnels (520) that may be associated with the user network device (510) (e.g. TEID X)), one or more additional requests (e.g., 590) for one or more additional data objects that may be associated with the first object, associate the one or more requests with the pre-fetching session corresponding to the first request (580), determine that at least one data object of the requested one or more additional data objects is stored in a memory of the user-facing station (530), and transmit the at least one data object of the additional data objects (e.g., 591) to the user network device (510), for example, over the second GTP tunnel of the one or more GTP tunnels (520) (e.g., TEID Y). The HTTP module of the user-facing station (530) may be further configured to drop a request for the at least one data objects of the additional data objects (e.g., 590) and/or not transmit it to the web-facing station (550), for example, due to servicing that request from a memory of the user-facing station (530). Acceleration of HTTP traffic may often be exercised for at least the purpose of improving a browsing experience (e.g., of one or more users). In some embodiments, for at least the purpose of improving such a browsing experience, acceleration of HTTP traffic that may be encapsulated inside one or more GTP tunnels may comprise a caching technique, for example, caching of HTTP traffic encapsulated inside one or more GTP tunnels.

Referring to FIG. 5, as previously described, following an exchange of a first request for a first data object (580) and a first response (583) corresponding to the first request (e.g., where the first request and the first response are associated with an HTTP session), the user-facing station (530) and/or the web-facing station (550) may have associated the HTTP session with corresponding first and second GTP tunnels (e.g., TEID X and TEID Y, respectively) at each of the respective stations (530, 550). In some embodiments, that association may occur prior to exchanging the first request (580) and the first response (583), for example, upon establishing a TCP connection underlying the HTTP session. A GTP module of the user-facing station (530) may be configured to, after said association, receive (e.g., from the network user device (510) and over the first GTP tunnel that may be a forward GTP tunnel for the HTTP session at the user-facing station (530)) one or more subsequent requests for one or more data objects that may be associated with the first data object and forward the one or more subsequent requests to an HTTP proxy module (e.g., 240 in FIG. 2) of the user-facing station (530). The HTTP proxy module of the user-facing station (530) may be configured to receive the one or more requests for the data objects, determine whether a data object corresponding to at least one of the one or more requests is stored in a cache associated with the HTTP proxy module, and generate a response (e.g., to the at least one of the one or more requests) comprising at least the data object if the data object is stored in the cache. Furthermore, the HTTP proxy module of the user-facing station (530) may be further configured to transmit (forward) at least one of the one or more requests (e.g., GET) for data objects to a corresponding web-facing station (550) if a data object associated with the at least one of the one or more requests is not be stored in the cache or if a data object associated with the at least one of the one or more request is stored in the cache but may need to be refreshed. The HTTP proxy module of the user-facing station (530) may be configured to generate at least one response corresponding to the at least one forwarded request upon receiving a data object corresponding to the at least one forwarded request from the corresponding web-facing station (550). The HTTP proxy module of the user-facing station (530) may be further configured to, upon generating the at least one response, inspect one or more properties of the data object corresponding to the at least one response and store the data object in the cache if the data object qualifies for storage in the cache in accordance with said inspecting. The user-facing station (530) may be further configured to transmit one or more responses corresponding to the one or more subsequent requests (e.g., to the user network device (510)), for example, over the second GTP tunnel (e.g., TEID Y), which may be a return GTP tunnel for the HTTP session at the user-facing station (530).

Traffic redundancy elimination may be used for at least the purpose of reducing bandwidth (capacity) consumption, wherein traffic redundancy elimination may comprise detecting recurring patterns within a traffic stream. When traffic is encapsulated inside a GTP tunnel, however, conventional methods for traffic redundancy elimination may not be effective, for example, due to failing to detect different streams inside the GTP tunnel. In some embodiments, the satellite modem may be configured to apply traffic redundancy elimination techniques to traffic encapsulated inside one or more GTP tunnels, for example, using the sender station (200) and/or the receiver station (300) of the satellite modem.

In some embodiments, traffic redundancy elimination may be applied, for example, to TCP traffic encapsulated in one or more GTP tunnels. A sender station (200) may be configured to receive one or more TCP segments encapsulated in a GTP tunnel (310), extract one or more payloads from the one or more TCP segments (e.g., as previously described), determine at least one stream that may be associated with the one or more TCP segments, and search the payloads associated with the at least one stream for one or more recurring patterns. The sender station (200) may be configured to detect at least one recurring pattern in at least one stream, store the recurring pattern in a memory of the sender station (200), and inform a corresponding receiver station (300) of the at least one recurring pattern in the at least one stream. The receiver station (300) may be configured to receive an indication comprising a recurring pattern for at least one stream and store the at least one recurring pattern for the at least one stream in a memory of the receiver station (300).

Furthermore, the sender station (200) may be configured to receive one or more additional TCP segments encapsulated in the GTP tunnel (310), extract one or more additional payloads corresponding to the at least one stream from the one or more additional TCP segments, and detect the at least one recurring pattern associated with the at least one stream in the one or more additional payloads. The sender station (200) may be configured to, upon detecting the at least one recurring pattern, send the respective payloads to the receiver station (300) with the recurring pattern replaced by a shorter representation of the recurring pattern. In some embodiments, a shorter representation for a recurring pattern may comprise an index and an offset, wherein the index may be used for identifying the recurring pattern from one or more stored recurring patterns associated with the at least one stream, and wherein the offset may be used to indicate a location within a respective payload corresponding to (e.g., the start of) the recurring pattern. The receiver station (300) may be configured to detect the shorter representation indication, search in a memory of the receiver station (300) for the recurring pattern corresponding to the shorter representation, and reconstruct one or more corresponding payloads by replacing the shorter representation with the corresponding recurring pattern. The receiver station (300) may be further configured to, upon reconstructing the payloads, restore one or more TCP headers corresponding to the reconstructed payloads and transmit the restored TCP segments encapsulated in a GTP tunnel (330), as previously described.

In some embodiments, the satellite modem may be configured to provide specialized processing to UDP traffic encapsulated inside one or more GTP tunnels, for example, using the sender station (200) and/or the receiver station (300) of the satellite modem. In some embodiments, UDP traffic that may be specifically processed may include SIP signaling traffic, RTP traffic, non-RTP real-time traffic (e.g., signaling for cellular networks, Skype voice traffic, etc.), and non-real-time traffic (e.g., DNS queries and responses for at least the purpose of enabling DNS caching).

A GTP module (210) of a sender station (200) may be configured to receive a packet comprising a UDP segment encapsulated in a first GTP tunnel, and associate the packet with a first internal tunnel that may correspond to the first GTP tunnel. In some embodiments, if the GTP encapsulated UDP segment corresponds to a session (e.g., an RTP session), association of the packet with a first internal tunnel (and/or with a sequence number indicator) may be determined in accordance with the session, which may be established between the sender station (200) and a corresponding receiver station (300). The GTP module (210) of the sender station (200) may be configured to classify the packet to a SIP class, RTP class, real-time traffic class, and/or non-real-time traffic class, generate a corresponding packet (e.g., by applying GTP tunnel header compression, as previously described), wherein the corresponding packet may be associated with an internal TEID index corresponding to the first internal tunnel, and forward the corresponding packet (e.g., in accordance with the class associated with the received packet) to a VoIP module (250), a jitter- and delay-sensitive-traffic module (260), and/or a jitter- and delay-tolerant-traffic module (270) of the sender station (200). In some embodiments, the corresponding packet may comprise the UDP segment included in the received packet. The VoIP module (250), the jitter- and delay-sensitive-traffic module (260) and/or the jitter- and delay-tolerant-traffic module (270) of the sender station (200) may be configured to receive the corresponding packet, to generate a packet comprising an internal TEID index corresponding to the first internal tunnel and/or a sequence number indicator (e.g., in the event that sequence numbers need to be reconstructed by a corresponding receiver station (300)). In some embodiments, generating the packet may comprise compressing one or more headers of the UDP segment, for example, in accordance with a compression policy or an application associated with the UDP segment. In some embodiments, said compressing may comprise stripping one or more of an IP header, UDP header, and/or RTP header, and replacing them with a descriptor corresponding to an application associated with the UDP segment. The VoIP module (250), the jitter- and delay-sensitive-traffic module (260), and/or the jitter- and delay-tolerant-traffic module (270) of the sender station (200) may be configured to forward the packet to the satellite interface module (290) of the sender station (200) (e.g., for transmission to a respective receiver station (300)).

Furthermore, the VoIP module, jitter- and delay-sensitive-traffic module, and/or jitter- and delay-tolerant-traffic module of the receiver station (300) may be configured to receive the packet (e.g., via a satellite interface module of the receiver station (300)), wherein the packet may comprise a payload of the UDP segment and an internal TEID index corresponding to the first internal tunnel and/or a sequence number indicator. The VoIP module, the jitter- and delay-sensitive-traffic module, and/or the jitter- and delay-tolerant-traffic module of the receiver station (300) may be configured to generate a corresponding packet, wherein generating the corresponding packet may comprise reconstructing one or more headers in accordance with a compression policy or an application associated with the packet. In some embodiments, said reconstructing may comprise reconstructing one or more of an IP header, UDP header, and/or RTP header in accordance with a descriptor included in the packet. The VoIP module, the jitter- and delay-sensitive-traffic module and/or the jitter- and delay-tolerant-traffic module of the receiver station (300) may be configured to forward the corresponding packet to a GTP module of the receiver station (300). The GTP module of the receiver station (300) may be configured to receive the corresponding packet, associate it with the first internal tunnel (e.g., in accordance with an internal TEID index) and to generate a packet encapsulating the corresponding packet into a GTP tunnel corresponding to the included internal TEID index (e.g., the first GTP tunnel). In some embodiments, encapsulating the corresponding packet may comprise reconstructing an IP header, UDP header, and/or a GTP header corresponding to the first GTP tunnel (e.g., as previously described). In some embodiments, said reconstructing may further include reconstructing a MAC header corresponding to the first GTP tunnel. The GTP module of the receiver station (300) may be further configured to transmit the encapsulating packet (e.g., to a coupled network device). In some embodiments, the GTP module of the receiver station (300) may be further configured to determine whether the packet and/or the corresponding packet includes a sequence number indicator and if so, generate an encapsulating packet comprising a sequence number field in the GTP header and increase by one a sequence number associated with the GTP tunnel.

In some embodiments, session initiation protocol (SIP) messages may be exchanged between network devices (e.g., 120 and 160) for at least the purpose of establishing one or more voice calls, video calls, or other types of sessions. As shown in FIG. 1, the link between network devices (120, 160) may comprise a satellite link, which may be associated with limited capacity. Occasionally, it may be that at the time of trying to establish a new session the satellite link may have insufficient vacant capacity to support the new session. At least for the purpose of avoiding poor session quality, on such occasions, it may be advantageous to reject the call establishment attempt in an orderly manner. In some embodiments, a satellite modem (e.g., 130, 150) coupled to a network device (e.g., 120, 160) may be configured to determine lack of vacant capacity over the satellite link for supporting a new session and generate and transmit a termination message towards the coupled network device for at least the purpose of forcing termination of the new session. Wherein SIP messages used for session management (e.g., establishment and tear-down) are encapsulated in one or more GTP tunnels, the satellite modem may receive a SIP message from a coupled network device in a first GTP tunnel (e.g., a forward GTP tunnel for the session at the satellite modem) and may need to send a termination message to the coupled network device in a second GTP tunnel (e.g., a return GTP tunnel for the session at the satellite modem), wherein the second GTP tunnel may be different from the first GTP tunnel.

Session initiation protocol (SIP) messages may be sent in UDP segments (though SIP may be supported over TCP and other transport protocols as well), and consequently, associating GTP encapsulated SIP messages and/or sessions with a forward GTP tunnel and a return GTP tunnel, for example, as previously described in the case of TCP, may be inapplicable.

A network device (e.g., 120, 160) coupled to a satellite modem (e.g., 130, 150) may initiate a SIP transaction (session) using a SIP method (e.g., Invite or Register) and expect a SIP response (e.g., the SIP message codes 1xx or 2xx may be applicable) to be received from a SIP counterpart. The satellite modem (e.g., 130, 150) coupled to the network device may be configured to extract one or more IP addresses and/or a call identifier (ID) from the one or more SIP messages (e.g., a SIP method message) and use the extracted one or more IP addresses and/or call ID for at least the purpose of associating a SIP session corresponding to the one or more SIP messages with a forward GTP tunnel and/or a return GTP tunnel for the session at the satellite modem. Once the SIP session has been associated with a forward GTP tunnel and return GTP tunnel at the satellite modem (e.g., 130, 150), the satellite modems may, if needed (e.g., upon determining lack of vacant capacity over the satellite link for supporting the session), force termination of the session, for example, by generating and sending a termination message (e.g., "Cancel," "Bye," or an error code message) on the return GTP tunnel corresponding to the session at the satellite modem. Furthermore, in some embodiments, once the SIP session has been associated with the respective GTP tunnels both at a sender station (200) and at a receiver station (300) included in said satellite modems (e.g., 130, 150), one or more RTP streams associated with the SIP session may be intercepted by the sender station (200) and the receiver station (300) (e.g., for at least the purpose of applying header compression to packets that may be associated with the one or more RTP streams).

As indicated above, one or more RTP streams may be established in association with a SIP session after the SIP session has been established, and in such a case, the parameters for intercepting the one or more RTP sessions may be known from the SIP session. In some embodiments, one or more RTP streams may be established using a protocol other than SIP (e.g., stream control transmission protocol (SCTP)), which a sender station (200) and/or a receiver station (300) might not support parsing. In such embodiments, with a slight exception that each direction of an RTP stream may be separately handled, a sender station (200) and/or a receiver station (300) may be configured to process RTP packets in a manner similar to processing RTP packets associated with streams associated with SIP sessions. The sender station (200) and the receiver station (300) may be configured to store in memory for each direction of each RTP stream a record comprising at least a TEID of a GTP tunnel corresponding to the respective RTP stream. Furthermore, the sender station (200) may be configured to apply header compression to the RTP packets, for example, by replacing one or more of an IP header, UDP header, and/or RTP header with a descriptor. A receiver station (300) may be configured to associate compressed RTP packets received from a sender station (200) with an RTP session, reconstruct one or more headers (e.g., an IP header, UDP header, and/or RTP header) in accordance with the RTP session, and encapsulate the reconstructed RTP packet in a GTP tunnel in accordance with a TEID that associated with the RTP session.

While not all real-time streams may be transmitted using RTP, such streams may also need to be properly handled (e.g., to reduce delay and/or jitter) when encapsulated in GTP tunnels. Handling of such streams (e.g., by a sender station (200) and/or a receiver station (300)) may be similar to handling RTP streams that are not associated with a known signaling protocol (e.g., SIP), for example, each direction of each such stream may be separately handled. Perhaps the main difference in handling non-RTP streams compared to handling RTP streams may be associated with detecting the streams. Since non-RTP streams may be carried over UDP with no additional header (e.g., an application-dependent header) or with an additional (e.g., application-dependent) header but such that the sender station (200) and/or the receiver station (300) may not be configured to parse, the sender station (200) and the receiver station (300) may be configured to detect non-RTP streams based on preconfigured filters, wherein a preconfigured filter may comprise one or more of a source IP address, destination IP address, source UDP port, destination UDP port, and/or Type of Service (ToS) or Differentiated Services Code Point (DSCP). The sender station (200) and the receiver station (300) may be further configured to compress and decompress headers of packets associated with non-RTP streams, wherein such compression may comprise compressing an IP header and/or a UDP header, if a UDP header is present.

In some embodiments, the satellite modem may be configured to perform DNS caching, wherein DNS queries and/or corresponding DNS responses may be encapsulated inside one or more GTP tunnels.

Usually, a user device sends a Domain Name System (DNS) query to a DNS server and the DNS server sends a DNS reply corresponding to the DNS query to the user device. The user device may use the DNS reply for DNS caching, wherein DNS caching may be a process used for improving response time, for example, in responding to subsequent DNS queries. As DNS messages (e.g., DNS queries and DNS responses) may be sent in UDP segments, methods for associating GTP encapsulated DNS messages and/or sessions with a forward GTP tunnel and a return GTP tunnel, for example as previously described in the case of TCP, may be inapplicable.

FIG. 6 shows a user network device (510), a user-facing station (530), a web-facing station (550) and one or more servers (570), as described in reference to FIG. 5. The user network device (510), the user-facing station (530), the web-facing station (550), and the one or more servers (570) may be coupled using one or more GTP tunnels (520, 560) and one or more corresponding internal tunnels (540), as previously described in reference to FIG. 5.

The user-facing station (530) may be configured to receive (e.g., from a user network device (510)) a first DNS query (610). The first DNS query (610) may be included in one or more UDP segments encapsulated in a first GTP tunnel of the one or more GTP tunnels (520) associated with the user network device (510), wherein the first GTP tunnel of the one or more GTP tunnels (520) may be associated with a first TEID (e.g., TEID X). A GTP module of the user-facing station (530) may be configured to associate the one or more UDP packets with a DNS class (e.g., as previously described) and forward the one or more packets (first DNS query) to a DNS module of the user-facing station (530) (e.g., 280 in FIG. 2). The DNS module of the user-facing station (530) may be configured to store in a memory one or more information items associated with the first DNS query (e.g., a destination IP address and/or server name) and transmit the first DNS query (611) to the web-facing station (550) (e.g., using a first internal tunnel (540) corresponding to the first GTP tunnel of the one or more GTP tunnels (520)).

The web-facing station (550) may be configured to receive (e.g., from the user-facing station (530) and/or over the first internal tunnel (540)) at least the first DNS query (611), associate the first DNS query with a first GTP tunnel of the one or more GTP tunnels (560) that may be associated with the one or more servers (570), encapsulate the DNS query in the first GTP tunnel of the one or more GTP tunnels (560), and transmit the first DNS query (612) to a DNS server of the one or more web servers (570). The web-facing station (550) may be further configured to receive a first DNS response (620) corresponding to the first DNS query (612) (e.g., from a DNS server (570)). The first DNS response (620) may be included in one or more UDP segments encapsulated in a second GTP tunnel of the one or more GTP tunnels (560) associated with the one or more servers (570), wherein the second GTP tunnel of the one or more GTP tunnels (560) may be associated with a second TEID (e.g., TEID Y). The web-facing station (550) may be configured to transmit the first DNS response (621) to the user-facing station (530) (e.g., using a second internal tunnel (540) corresponding to the second GTP tunnel of the one or more GTP tunnels (560)). At least for the purpose of supporting DNS caching, the web-facing station (550) may be configured to process DNS messages in a manner similar to processing any UDP segment that may be application unspecific (e.g., as previously described), wherein said processing may include GTP tunnel header compression and/or compression of IP and/or UDP headers associated with the DNS messages.

The DNS module of the user-facing station (530) may be configured to receive, (e.g., from the web-facing station (550) and/or over the second internal tunnel (540) corresponding to a second GTP tunnel of the one or more GTP tunnels (520)), at least the first DNS response and associate the first DNS response with the first DNS query, wherein said associating may comprise, for example, using the one or more information items associated with the first DNS query, which may have been previously stored in a memory of the user-facing station (530). The user-facing station (530) may be configured, for at least the purpose of processing subsequent DNS queries, to derive from said association of the first DNS response with the corresponding first DNS query an association between the first GTP tunnel of the one or more GTP tunnels (520) (forward GTP tunnel) and the second GTP tunnel of the one or more GTP tunnels (520) (return GTP tunnel) and store the derived association between the first GTP tunnel and the second GTP tunnel, for example, in a tunnels database of a GTP module of the user-facing station (530). The user-facing station (530) may be further configured to encapsulate the first DNS response in accordance with the second GTP tunnel of the one or more GTP tunnels (520) and transmit the first DNS response (622) (e.g., to the user network device (510)). The DNS module of the user-facing station (530) may be further configured to use at least one DNS caching method for at least the purpose of caching DNS information using information included in the first DNS query and/or the first DNS response.

The user-facing station (530) may be configured to receive (e.g., from a user network device (510)), a second DNS query (630), wherein the second DNS query (630) may correspond to the same domain as the first DNS query (610) or to a different domain. The second DNS query (630) may be included in one or more UDP packets encapsulated in the first GTP tunnel of the one or more GTP tunnels (520) (e.g., TEID X) associated with the user network device (510). The user-facing station (530) may be configured to determine, for example, using a tunnels database of a GTP module of the user-facing station (530), a second GTP tunnel of the one or more GTP tunnels (520), wherein the second GTP tunnel (e.g., TEID Y) may be the return GTP tunnel corresponding to the first GTP tunnel (forward GTP tunnel). The user-facing station (530) may be configured to, if a second GTP tunnel may be determined, use the at least one DNS caching method for at least the purpose of retrieving DNS information from a DNS cache, generate a DNS response corresponding to the second DNS query (630) using the retrieved DNS information, encapsulate the DNS response in accordance with the second GTP tunnel of the one or more GTP tunnels (520), and transmit the GTP encapsulated DNS response (640) (e.g., to the user network device (510)). The user-facing station (530) may be configured to, if a second GTP tunnel may not be determined, process the second DNS query as previously described in reference to the first DNS query, even if DNS information for the domain associated with the second DNS query may be available in a DNS cache associated with the user-facing station (530).

According to 3GPP recommendations (ETSI TS 129 281, paragraph 4.2.2), GTP endpoints should avoid IP fragmentation of GTP packets (e.g., packets exchanged between GTP endpoints using the GTP-U), yet IP fragmentation of GTP packets is not categorically forbidden. In some embodiments, a GTP module of a sender station (200) and/or a GTP module of a receiver station (300) may be configured to support transfer of IP fragmented GTP packets over a satellite link.

As previously described, the receiver station (300) may be configured to reconstruct or locally generate at least a sequence number field in a GTP header of a packet transmitted by the receiver station (300) to a coupled network device (e.g., for at least the purpose of accelerating TCP traffic by generating local (spoofed) acknowledgements), wherein numbering of packets inside the GTP tunnel may be needed or requested. Such reconstruction or local generation of the sequence number field may lead to at least one GTP packet having a first sequence number value in the GTP tunnel (e.g., 310) at the sender station end and a second sequence number value in the GTP tunnel (e.g., 330) at the receiver station end, wherein the first sequence number value and the second sequence number value may be different. Such differences in sequence number values may not affect regular GTP packets, but it may cause an issue for an IP fragmented GTP packet.

An IP fragmented GTP packet may comprise two or more IP fragments, wherein a GTP header and a UDP header corresponding to the GTP packet may be included only in the first IP fragment but not in the additional one or more IP fragments. Thus, association of an IP fragment of the one or more additional IP fragments to a GTP tunnel may be achieved, for example, by at least comparing an identification field value that may be included in an IP header corresponding to the IP fragment (e.g., of the one or more additional IP fragments) with an identification field value that may be included in an IP header corresponding to the first IP fragment (e.g., wherein an Identification field included in an IP header may be used for identifying a group of fragments of an IP datagram).

The GTP module (210) of the sender station (200) may be configured to, upon receiving at least one packet (e.g., of the one or more received packets), determine whether the at least one packet may be a first fragment of an IP fragmented GTP packet, for example, by at least examining whether an MF flag (More Fragments) in an IP header corresponding to the at least one packet is set. The GTP module (210) of the sender station (200) may be configured to, upon determining that the at least one packet may be a first fragment of an IP fragmented GTP packet, extract an Identification field from the IP header corresponding to the at least one packet and create a new record in the tunnels database (215) (e.g., of the GTP module), the new record comprising at least the extracted Identification field (and/or an internal TEID index corresponding to the GTP tunnel corresponding to the IP fragmented GTP packet (e.g., based on a GTP header included in the first fragment of the IP fragmented GTP packet)). The GTP module (210) of the sender station (200) may be configured to, upon determining that the at least one packet may be a first fragment of an IP fragmented GTP packet, not apply GTP tunnel header compression to the at least one packet, mark the at least one packet as a first fragment of an IP fragmented GTP packet, and send the at least one packet (e.g., uncompressed) to the corresponding receiver station (300).

In some embodiments, the GTP module (210) of the sender station (200) may be further configured to, upon sending the at least one packet to the corresponding receiver station (300), forward the at least one packet to the satellite interface module (290) of the sender station (200) while bypassing (217) the one or more protocol specific and/or application specific modules (e.g., 220 to 280) of the sender station (e.g., denying any specialized processing for the at least one packet). The receiver station (300) may be configured to, upon receiving the at least one packet, determine that the at least one packet may be a first fragment of an IP fragmented GTP packet (e.g., by determining a first fragment mark associated with the at least one packet) and forward the at least one packet to the GTP module of the receiver station (300) while bypassing the one or more protocol specific and/or application specific modules of the receiver station (300).

The GTP module of the receiver station (300) may be configured to (e.g., upon receiving the at least one packet) determine that the at least one packet is uncompressed, determine that the at least one packet is a first fragment of an IP fragmented GTP packet, and determine whether a sequence number field included in a GTP header included in the at least one packet may need to be modified. The GTP module of the receiver station (300) may be configured to (e.g., upon determining that the said sequence number field does not need modifying) send the at least one packet (e.g., to a coupled network device). The GTP module of the receiver station (300) may be configured to (e.g., upon determining that the said sequence number field may need to be modified) modify the sequence number field (e.g., in accordance with a packet count at the receiver station (300) associated with a GTP tunnel corresponding to the at least one packet). Once the sequence number field in the GTP header included in the at least one packet has been modified, however, a checksum value in a UDP header that may be included in the at least one packet may no longer be correct.

Since the at least one packet may be transmitted by the sender station (200) and/or received by the receiver station (300) uncompressed, the at least one packet may still include the original GTP header of the IP fragmented GTP packet, including the original sequence number value (e.g., prior to the modifying described above) upon being received at the GTP module of the receiver station (300). The GTP module of the receiver station (300) may be configured to, upon modifying the sequence number field in the GTP header (e.g., that may be included in the at least one packet), record the original sequence number value prior to modifying the sequence number field in the GTP header, calculate a modified checksum value for the checksum field in the UDP header that may be included in the at least one packet (e.g., after modifying the sequence number field in the GTP header), replace the checksum value in the UDP header with the calculated modified checksum value, and transmit the modified at least one packet (e.g., that may include a modified GTP sequence number and/or a modified UDP checksum), for example, to a coupled network device. In some embodiments, calculating the modified checksum value (e.g., in accordance with RFC 1071 recommendations) may comprise determining the original checksum value (C) (e.g., from the UDP header included in the at least one packet), determining the original sequence number value (SN) (e.g., the recorded original sequence number), determining the modified sequence number value (SN'), and calculating the checksum value (C') using the formula $C'=C+(SN'-SN)$.

Furthermore, the GTP module (210) of the sender station (200) may be configured to, upon receiving an IP fragment (e.g., that may not be a first fragment of an IP datagram), use the tunnels database (215) for at least the purpose of determining whether the IP fragment may be associated with an IP fragmented GTP packet for which a first fragment may have already been received. The GTP module (210) of the sender station (200) may be configured to extract an identification value from identification field of an IP header corresponding to the IP fragment and search the tunnels database (215) for a record corresponding to the extracted identification value. The GTP module (210) of the sender station (200) may be configured to discard the IP fragment if a record corresponding to the extracted identification value does not exist in the tunnels database (215). The GTP module (210) of the sender station (200) may be configured to, if a record corresponding to the extracted Identification value exists in the tunnels database (215), mark the at least one packet as uncompressed and to send the at least one packet to the corresponding receiver station (300) (e.g., while bypassing (217), the one or more protocol specific and/or application specific modules (e.g., 220 to 280) of the sender station (200)). The GTP module (210) of the sender station (200) may be further configured to, upon determining that an IP fragment is associated with an existing record in the tunnels database (215), determine whether the IP fragment is the last fragment of an IP fragmented GTP packet (e.g., by determining that an IP header corresponding to the IP fragment includes an unset MF flag and a non-zero fragment offset), and delete the associated record from the tunnels database (215) if the IP fragment is the last fragment of the IP fragmented GTP packet. The receiver station (300) may be configured to, upon receiving the IP fragment, determine that the IP fragment is uncompressed and to send the IP fragment to a coupled network device, while bypassing the one or more protocol specific and/or application specific modules of the receiver station (300).

IP fragmentation may be used within a GTP tunnel (e.g., for the packets encapsulated inside the GTP tunnel). Such fragmentation may be handled by the sender station (200) and/or the receiver station (300). For example, the sender station (200) may be configured to send fragments of a packet without applying header compressing (e.g., at the encapsulated protocol level, but perhaps with GTP tunnel header compression) and/or the receiver station (300) may be configured to rebuild a packet from its received fragments prior to encapsulating the packet into the respective GTP tunnel.

Various aspects of the disclosure may be embodied as one or more methods, systems, apparatuses (e.g., components of a satellite communication network), and/or computer program products. Accordingly, those aspects may take the form of an entirely hardware embodiment, an entirely software embodiment, an entirely firmware embodiment, or an embodiment combining firmware, software, and/or hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In some embodiments, one or more computer readable media storing instructions may be used. The instructions, when executed, may cause one or more apparatuses to perform one or more acts described herein. The one or more computer readable media may comprise transitory and/or non-transitory media. In addition, various signals representing data or events as described herein may be transferred between a source and a destination in the form of electromagnetic waves traveling through signal-conducting media such as metal wires, optical fibers, and/or wireless transmission media (e.g., air and/or space).

Modifications may be made to the various embodiments described herein by those skilled in the art. For example, each of the elements of the aforementioned embodiments may be utilized alone or in combination or sub-combination with elements of the other embodiments. It will also be appreciated and understood that modifications may be made without departing from the true spirit and scope of the present disclosure. The description is thus to be regarded as illustrative instead of restrictive on the present disclosure.

What is claimed is:

1. A method comprising:
receiving, by a first device, a first plurality of packets encapsulated with general packet radio service tunneling protocol (GTP) headers;
removing the GTP headers from the first plurality of packets to yield a plurality of corresponding packets without GTP headers;
applying one or more acceleration techniques to the plurality of corresponding packets without GTP headers to yield a plurality of accelerated packets without GTP headers; and
transmitting the plurality of accelerated packets without GTP headers to a second device in communication, via a communications link, with the first device,
wherein the plurality of accelerated packets without GTP headers include information for generating a second plurality of packets encapsulated with GTP headers at the second device.

2. The method of claim 1, further comprising generating, at the second device, the second plurality of packets encapsulated with GTP headers, wherein the generating comprises:
determining, by the second device, based on the information, a tunnel endpoint identifier (TEID) of a GTP header of the second plurality of packets encapsulated with GTP headers.

3. The method of claim 1, wherein the information comprises a tunnel index specifying an internal tunnel carried over the communications link.

4. The method of claim 3, further comprising:
storing, by the first device, an association between the tunnel index and a TEID of a GTP header of the first plurality of packets encapsulated with GTP headers.

5. The method of claim 1, further comprising:
identifying recurring data in the plurality of corresponding packets without GTP headers; and
prior to the transmitting, removing the recurring data from the plurality of corresponding packets without GTP headers.

6. The method of claim 1, wherein the communications link is a satellite link, wherein the first device and the second device comprise satellite modems.

7. The method of claim 1, wherein the acceleration techniques include one or more of transmission control protocol (TCP) acceleration techniques, hyper text transfer protocol (HTTP) acceleration techniques, caching techniques, or Voice over IP (VoIP) treatment techniques.

8. An apparatus configured to:
receive a first plurality of packets encapsulated with general packet radio service tunneling protocol (GTP) headers;
remove the GTP headers from the first plurality of packets to yield a plurality of stripped packets;
apply one or more acceleration techniques to the plurality of stripped packets to yield a plurality of accelerated packets; and
transmit the plurality of accelerated packets to a second device in communication, via a communications link, with the apparatus,
wherein the plurality of accelerated packets include information for generating a second plurality of packets encapsulated with GTP headers at the second device.

9. The apparatus of claim 8, wherein the information comprises a tunnel index specifying an internal tunnel carried over the communications link.

10. The apparatus of claim 9, wherein the apparatus is further configured to:
store an association between the tunnel index and a TEID of a GTP header of the first plurality of packets encapsulated with GTP headers.

11. The apparatus of claim 8, wherein the apparatus is further configured to:
identify recurring data in the plurality of stripped packets; and
prior to the transmitting, remove the recurring data from the plurality of stripped packets.

12. The apparatus of claim 8, wherein the communications link is a satellite link, wherein the apparatus comprises a satellite modem.

13. The apparatus of claim 8, wherein the acceleration techniques include one or more of transmission control protocol (TCP) acceleration techniques, hyper text transfer protocol (HTTP) acceleration techniques, caching techniques, or Voice over IP (VoIP) treatment techniques.

14. A system comprising:
a first device and a second device in communication via a communication link,
wherein the first device is configured to:
receive a first plurality of packets encapsulated with general packet radio service tunneling protocol (GTP) headers;
remove the GTP headers from the first plurality of packets to yield a plurality of stripped packets;
apply one or more acceleration techniques to the plurality of stripped packets to yield a plurality of accelerated packets; and
transmit the plurality of accelerated packets to the second device,
wherein the second device is configured to:
generate, based on information in the plurality of accelerated packets, a second plurality of packets encapsulated with GTP headers.

15. The system of claim 14, wherein the second device is further configured to determine, based on the information, a TEID of a GTP header of the second plurality of packets encapsulated with GTP headers.

16. The system of claim 14, wherein the information comprises a tunnel index specifying an internal tunnel carried over the communications link.

17. The system of claim 16, wherein the first device is further configured to:
store an association between the tunnel index and a TEID of a GTP header of the first plurality of packets encapsulated with GTP headers.

18. The system of claim 14, wherein the first device is further configured to:
identify recurring data in the plurality of stripped packets; and
prior to the transmitting, remove the recurring data from the plurality of stripped packets.

19. The system of claim 14, wherein the communications link is a satellite link, wherein the first device and the second device comprise satellite modems.

20. The system of claim 14, wherein the acceleration techniques include one or more of transmission control protocol (TCP) acceleration techniques, hyper text transfer protocol (HTTP) acceleration techniques, caching techniques, or Voice over IP (VoIP) treatment techniques.

\* \* \* \* \*